Figure 2B:
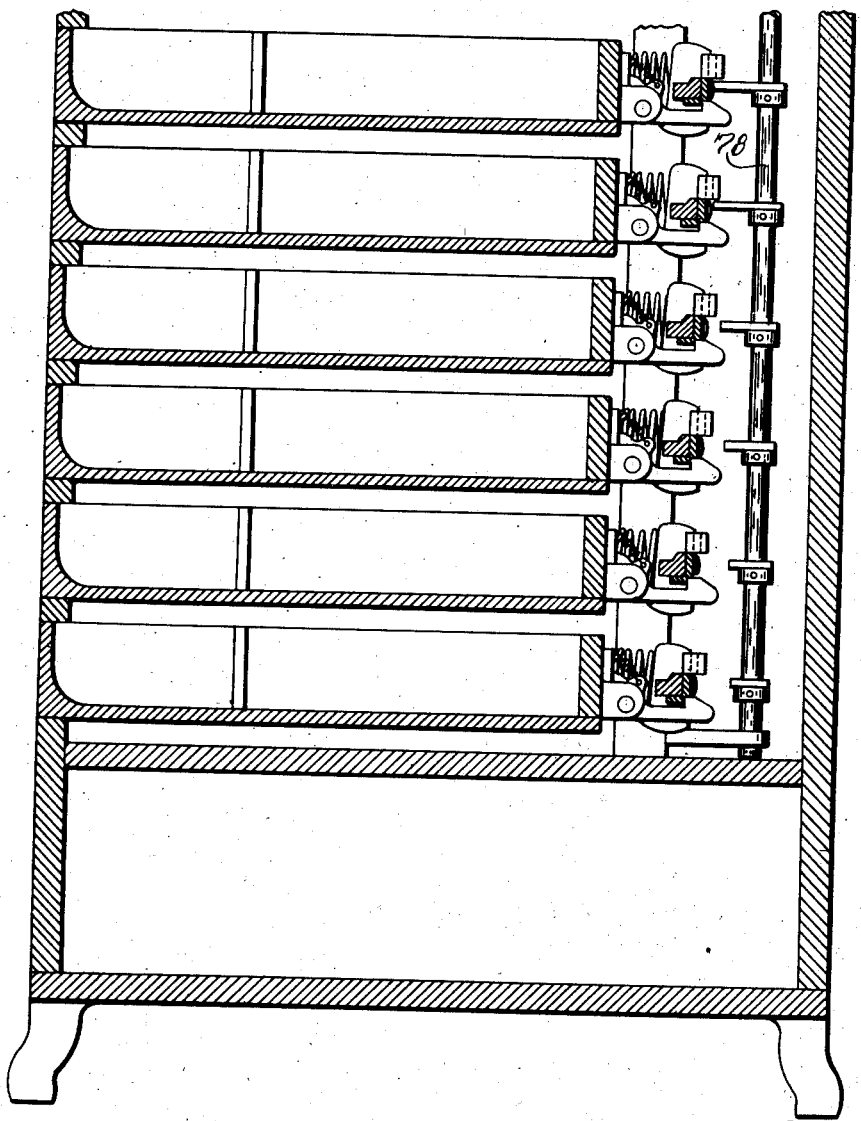

E. J. VON PEIN.
CASH REGISTER.
APPLICATION FILED MAY 26, 1909.
1,096,973.
Patented May 19, 1914.
20 SHEETS—SHEET 1.
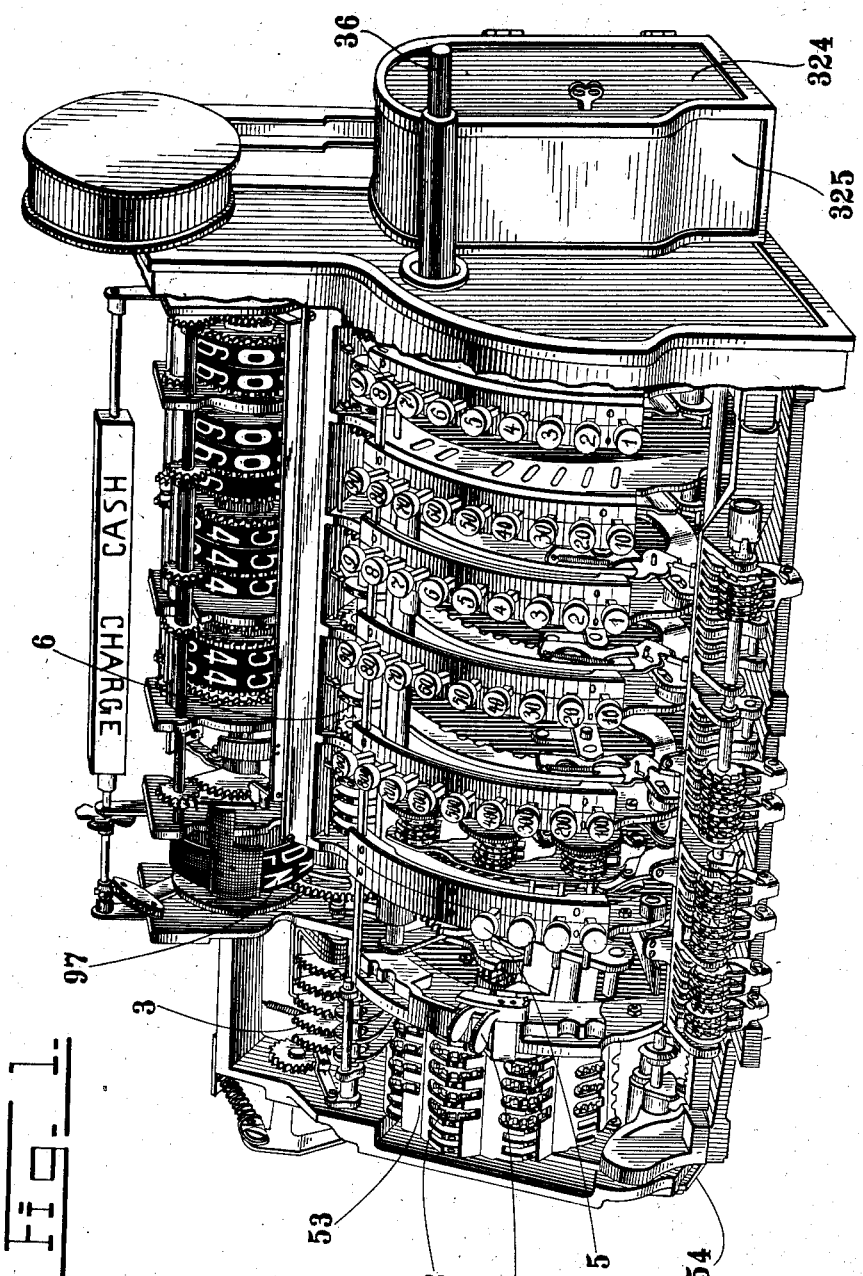

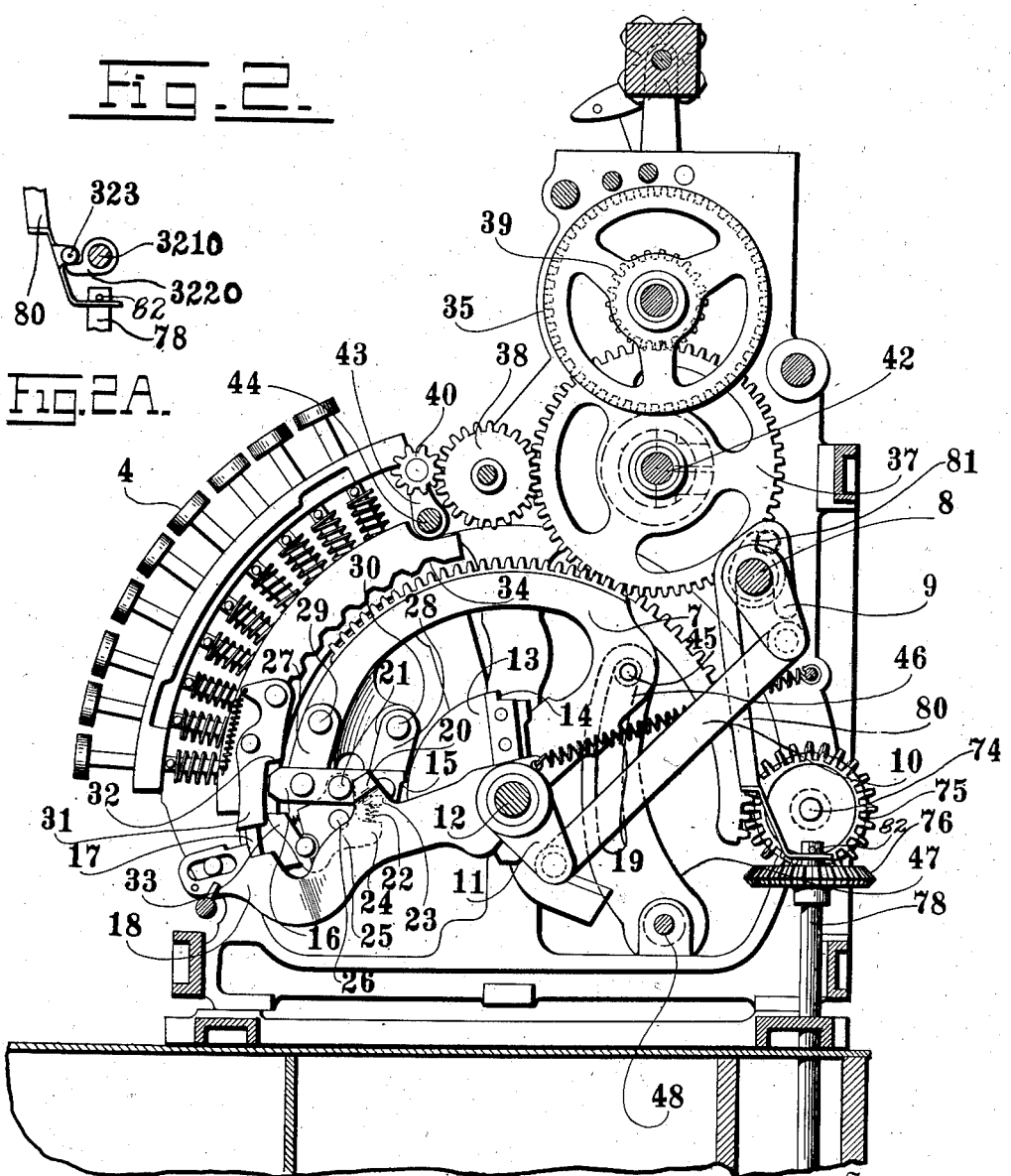

E. J. VON PEIN.
CASH REGISTER.
APPLICATION FILED MAY 26, 1909.

1,096,973.

Patented May 19, 1914.
20 SHEETS—SHEET 3.

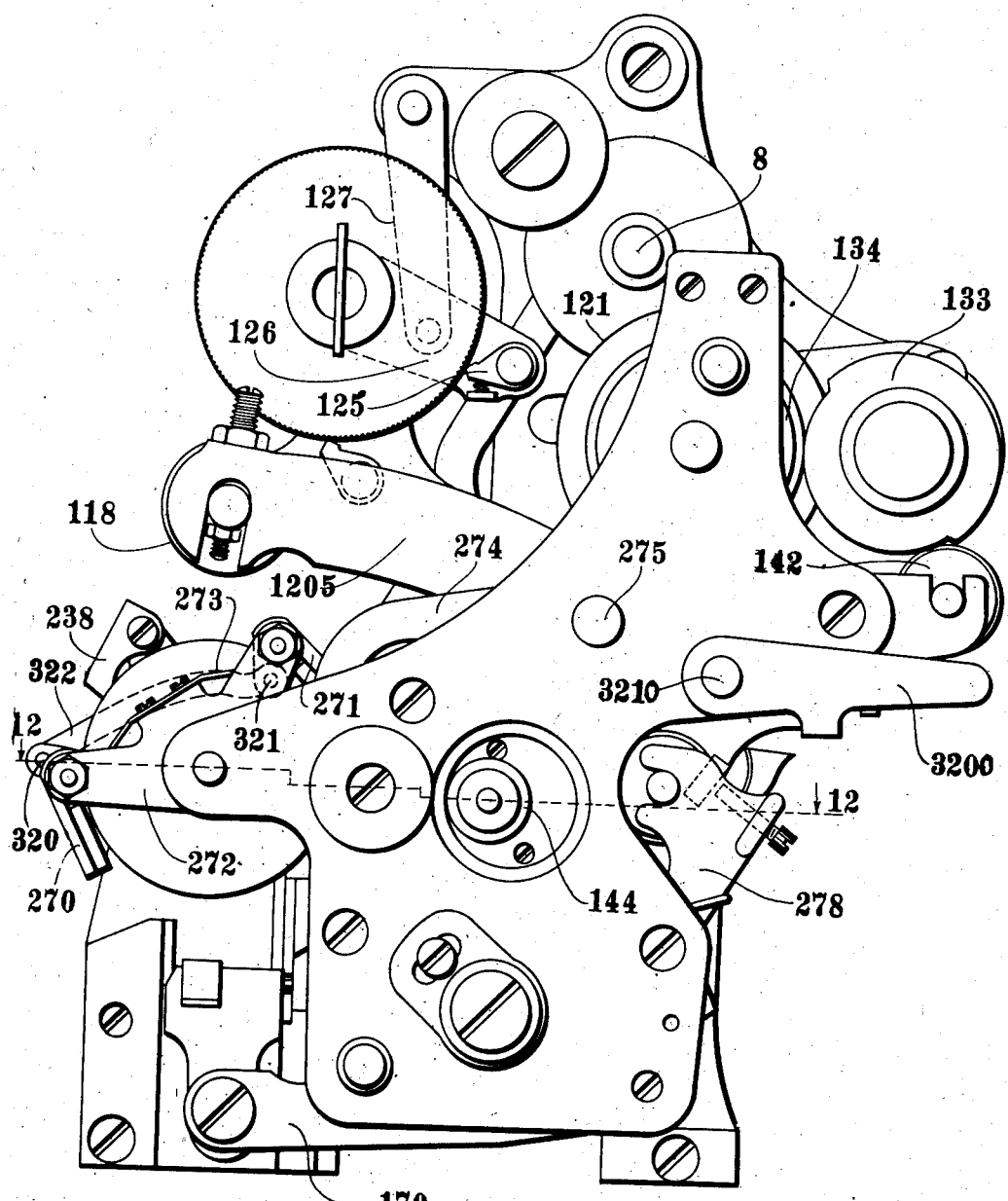

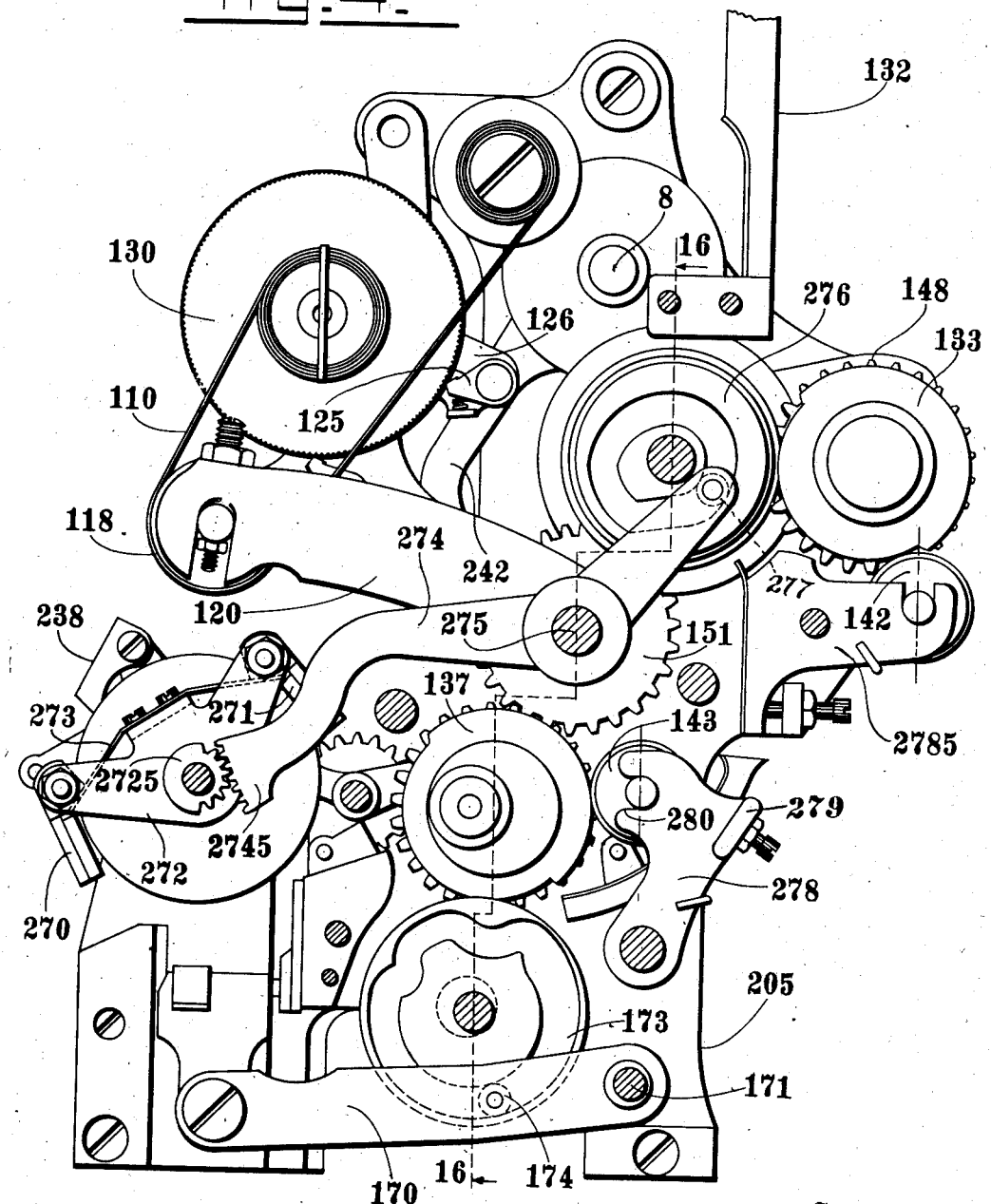

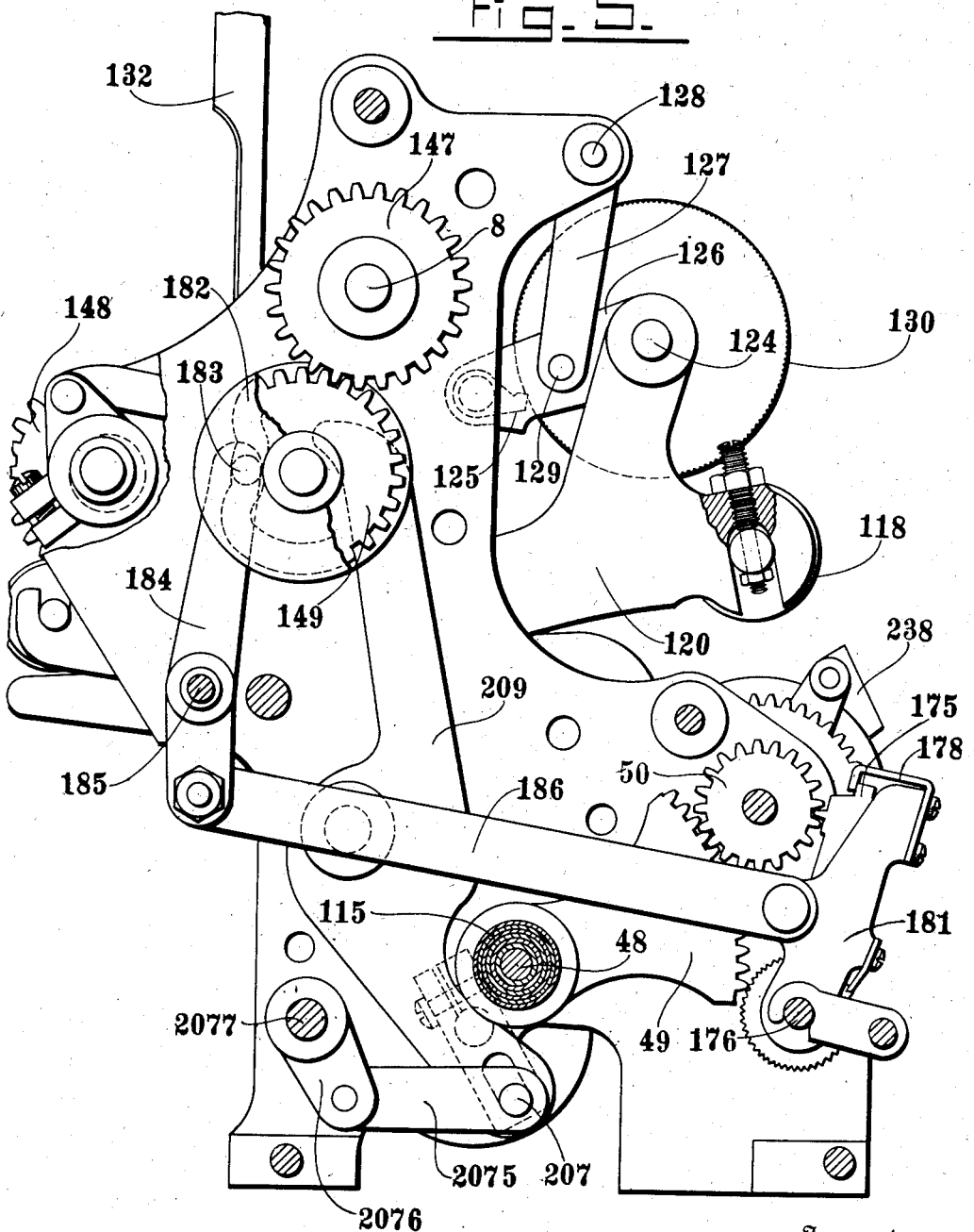

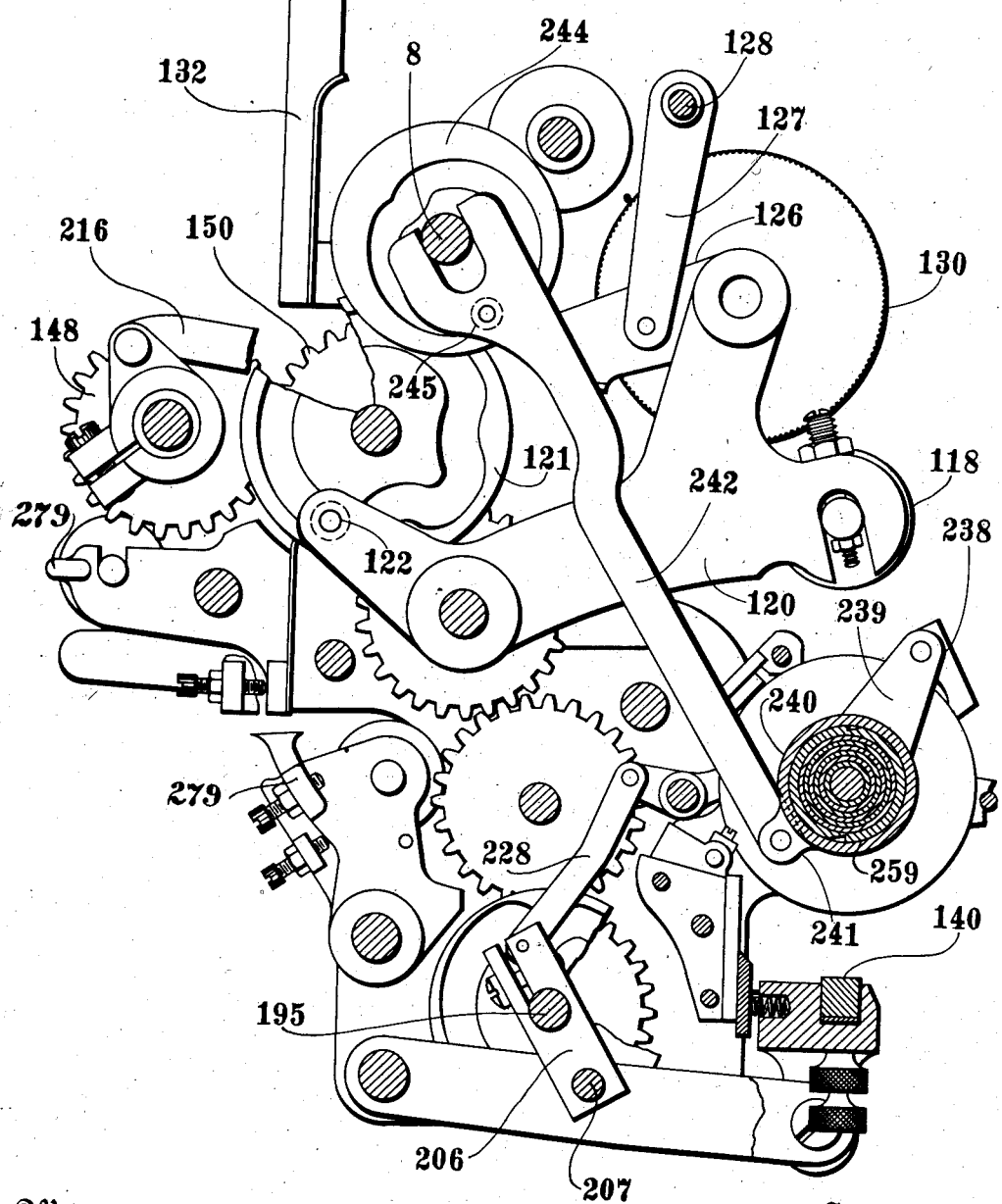

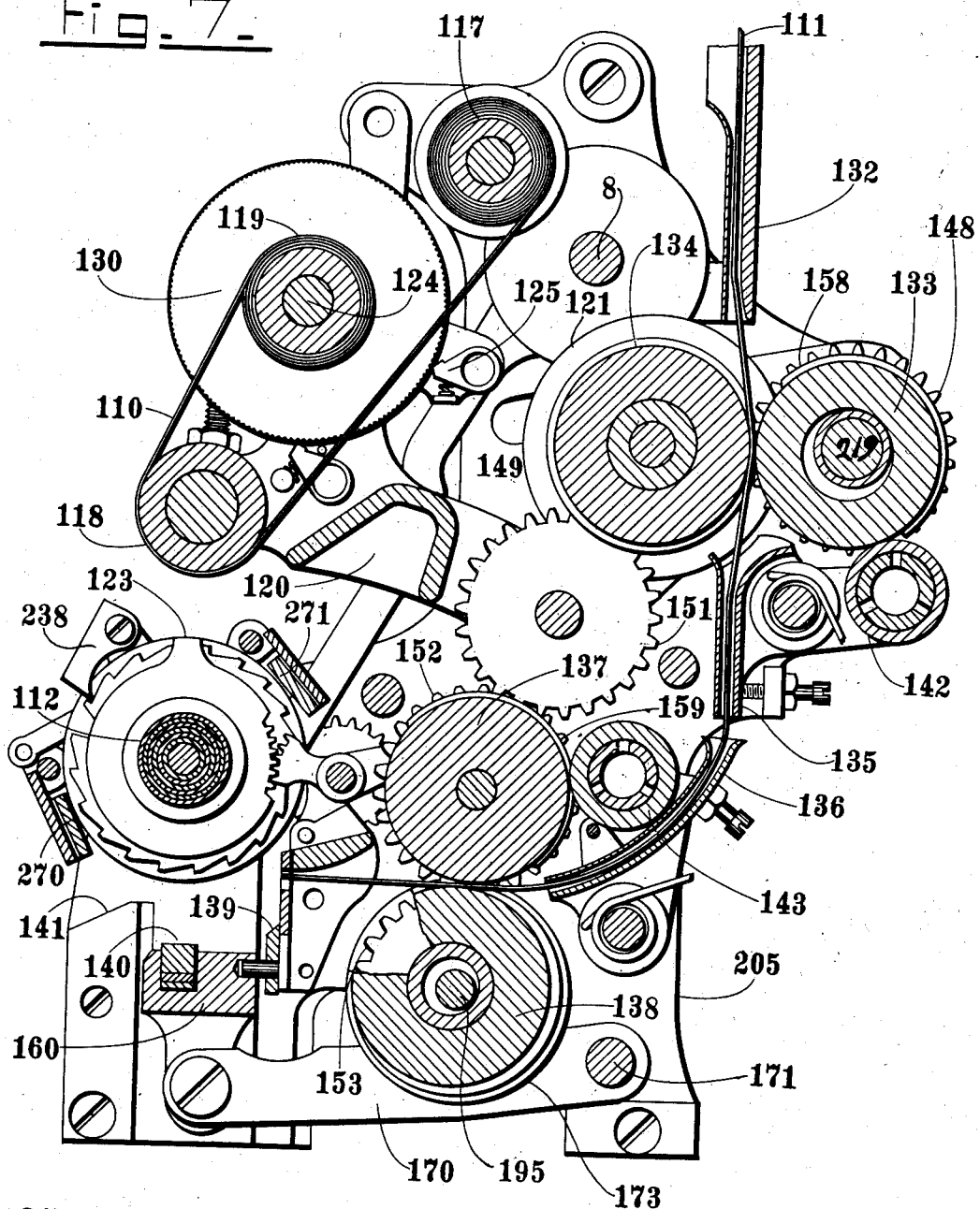

E. J. VON PEIN.
CASH REGISTER.
APPLICATION FILED MAY 26, 1909.
1,096,973.
Patented May 19, 1914.
20 SHEETS—SHEET 9.
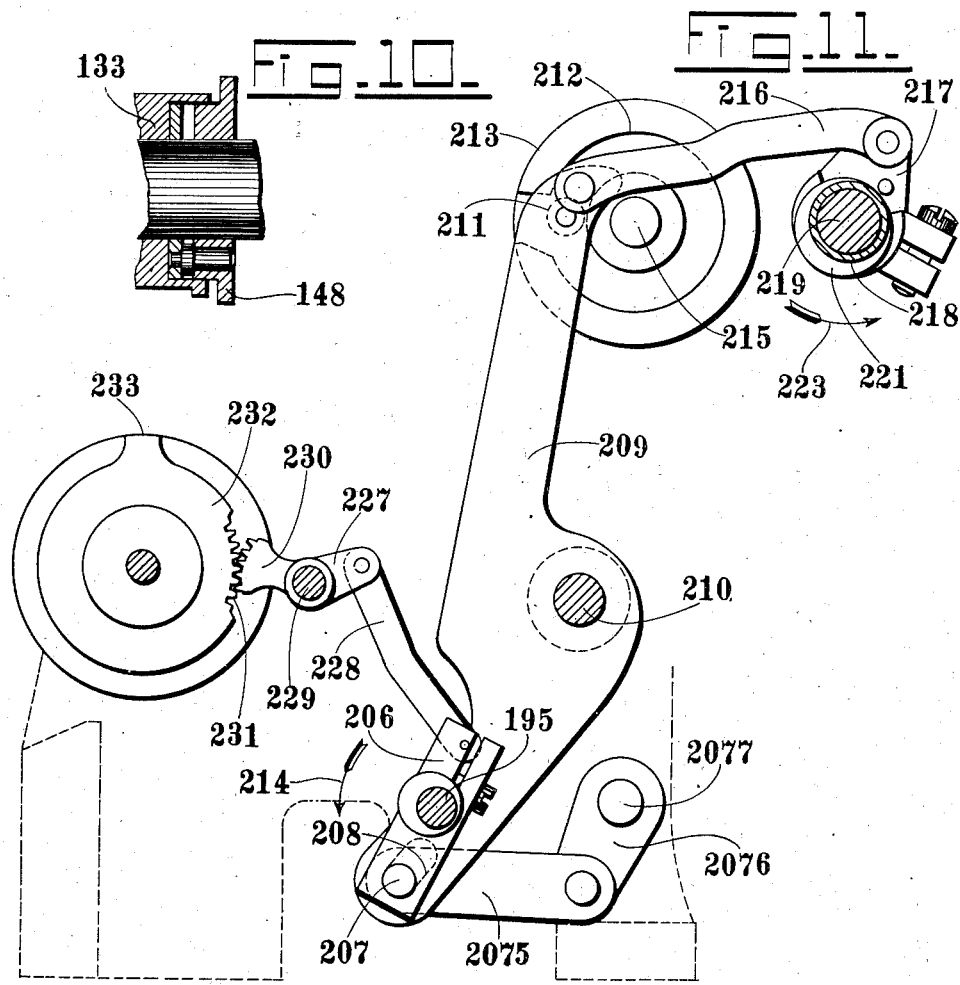
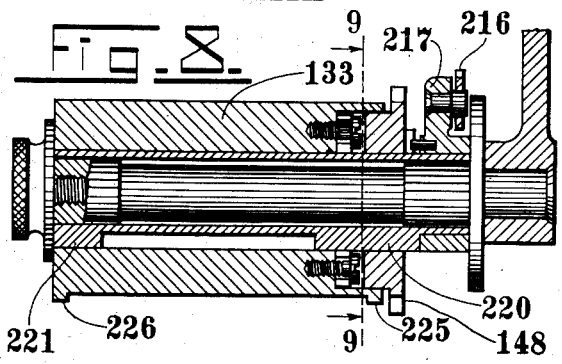
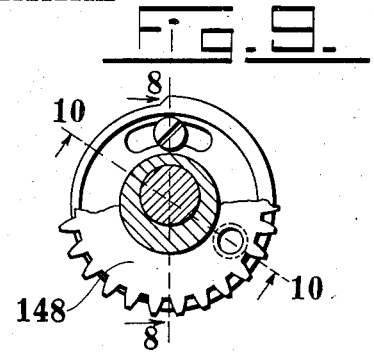
Witnesses
Inventor

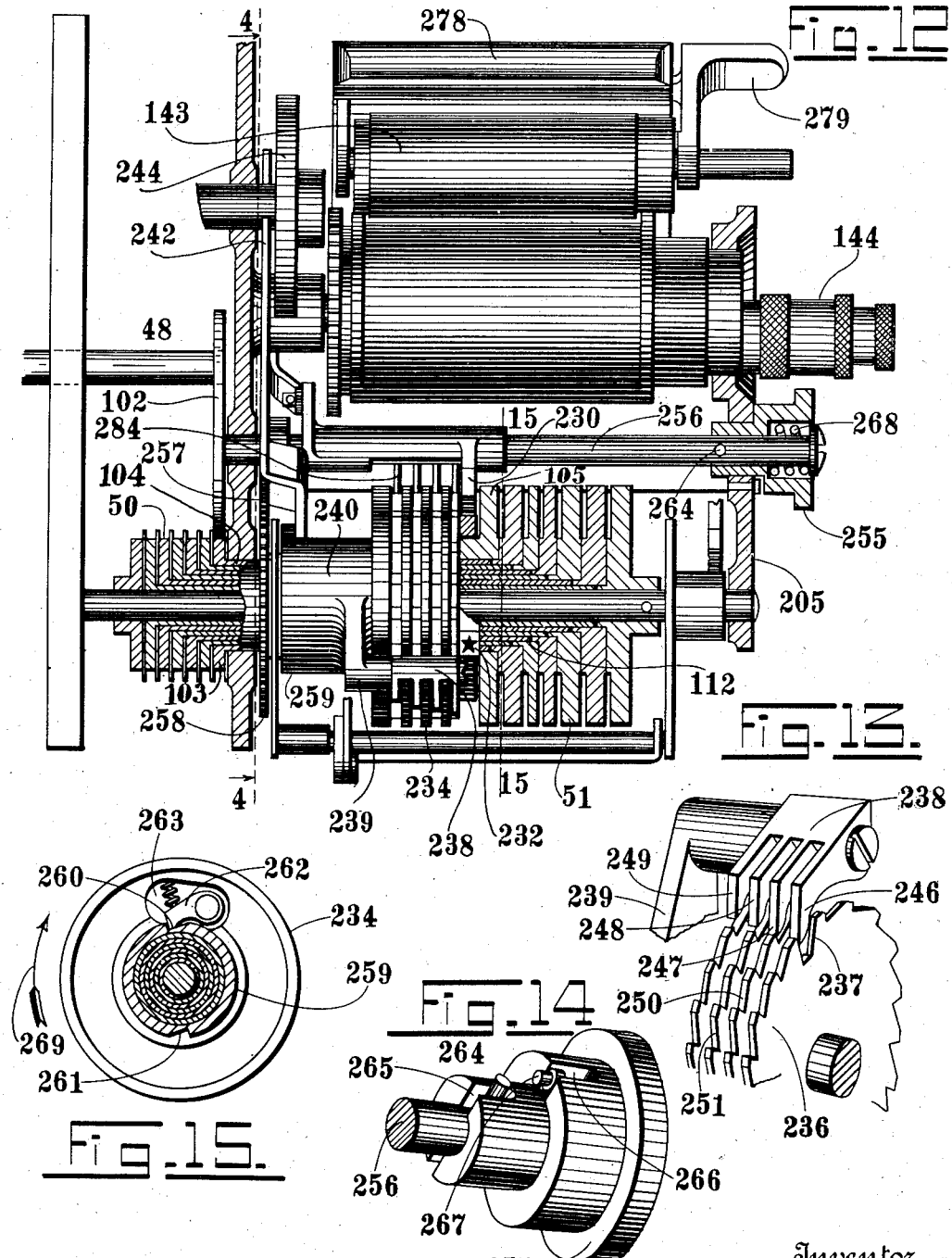

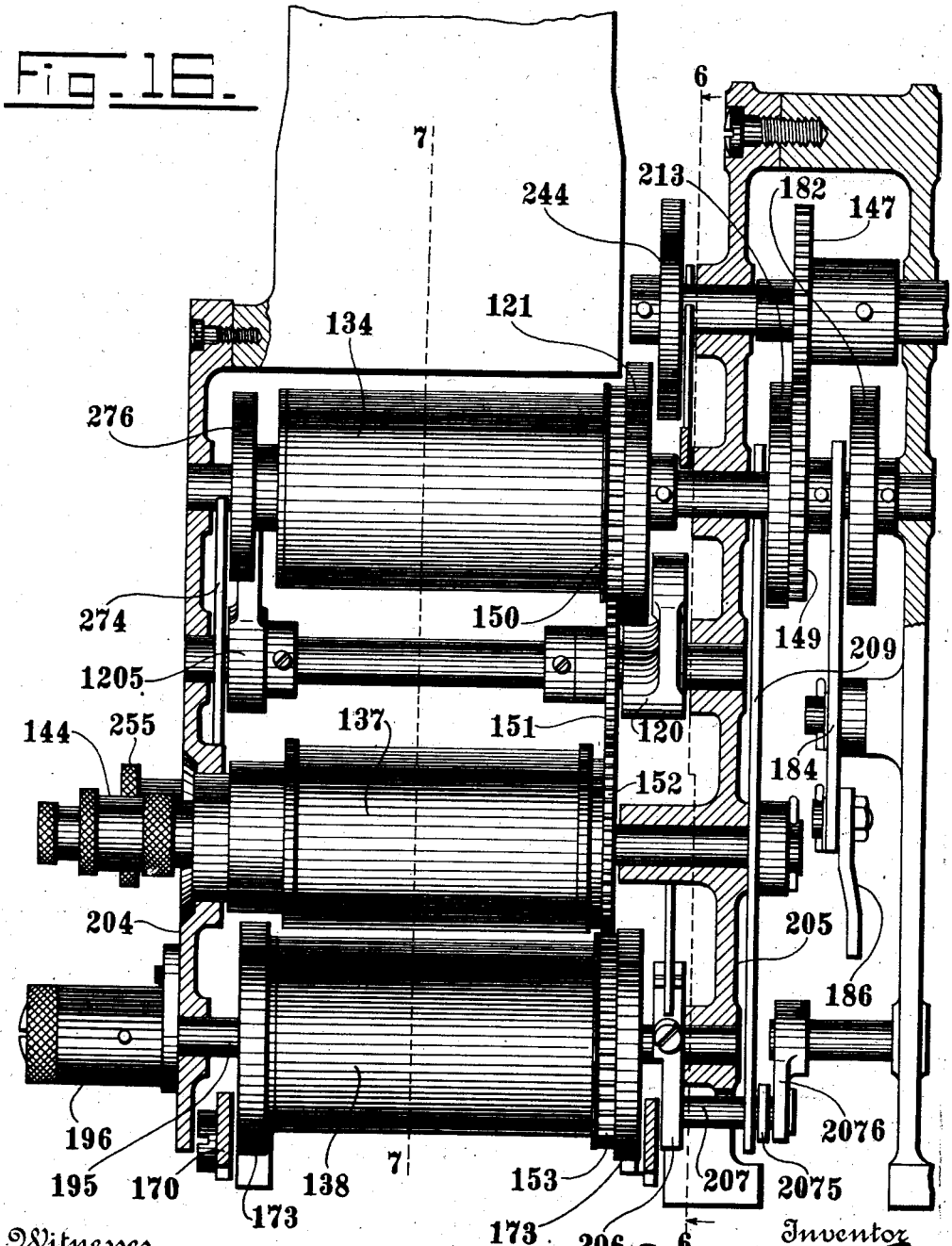

E. J. VON PEIN.
CASH REGISTER.
APPLICATION FILED MAY 26, 1909.
1,096,973.
Patented May 19, 1914.
20 SHEETS—SHEET 12.
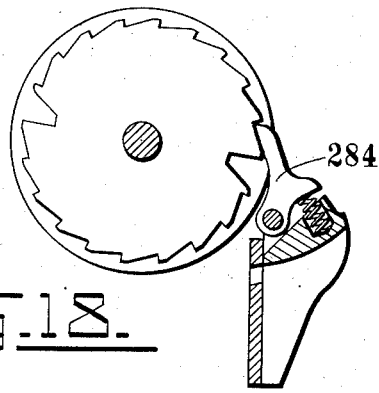
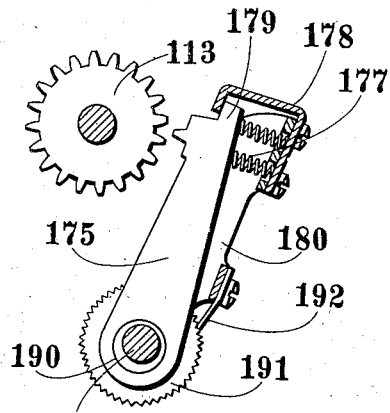
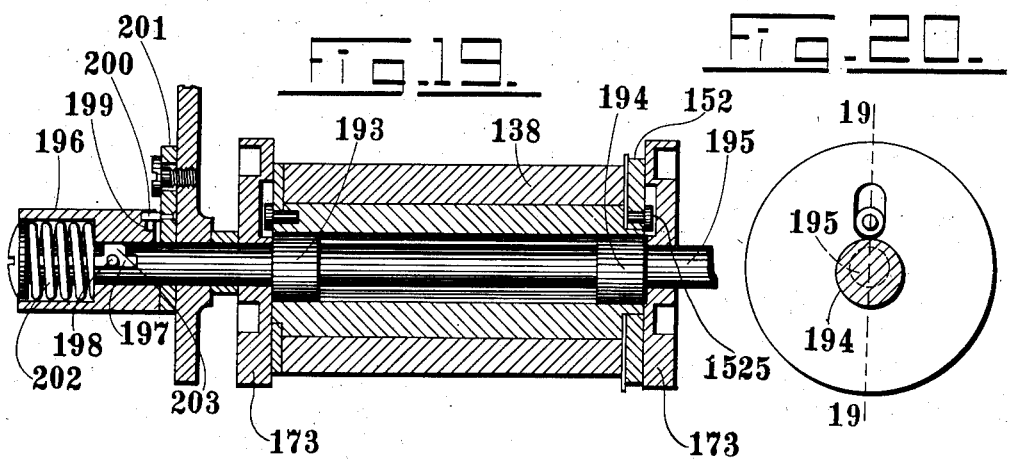
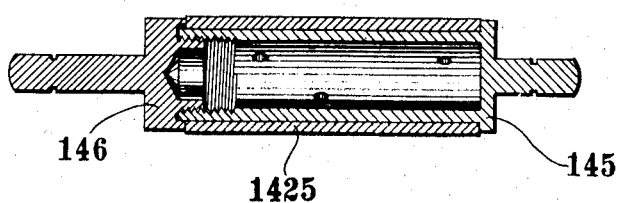

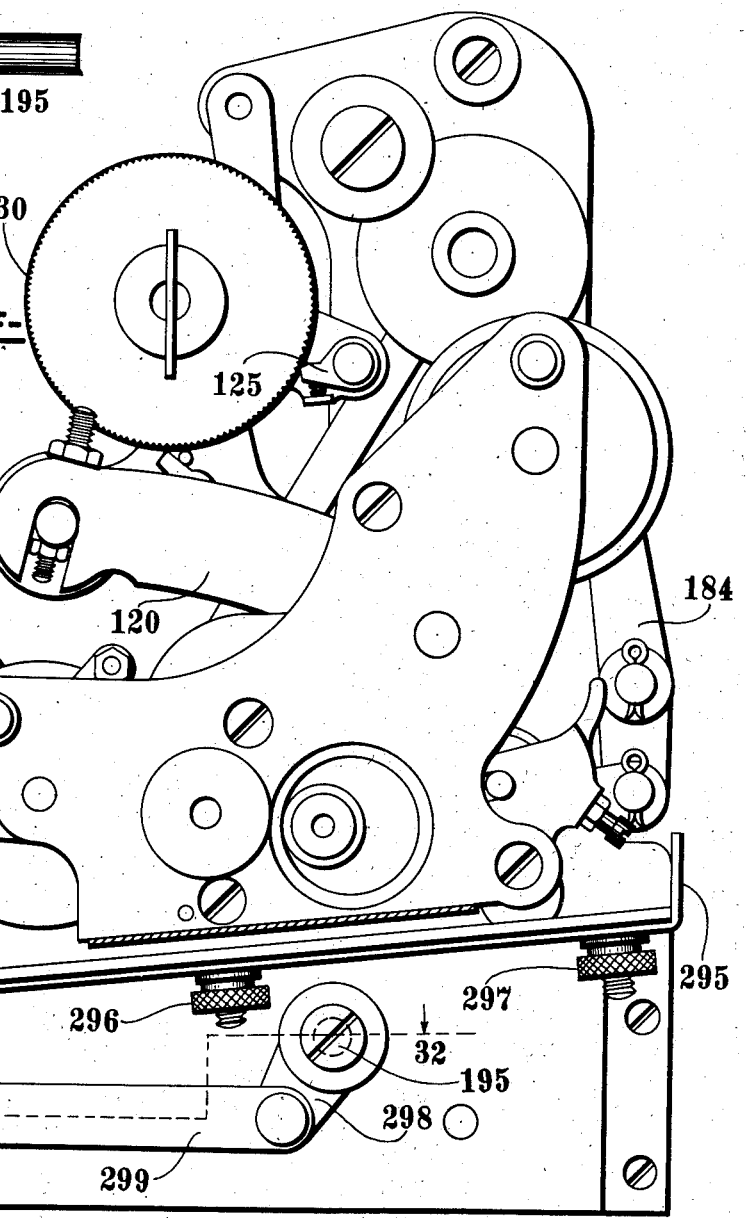

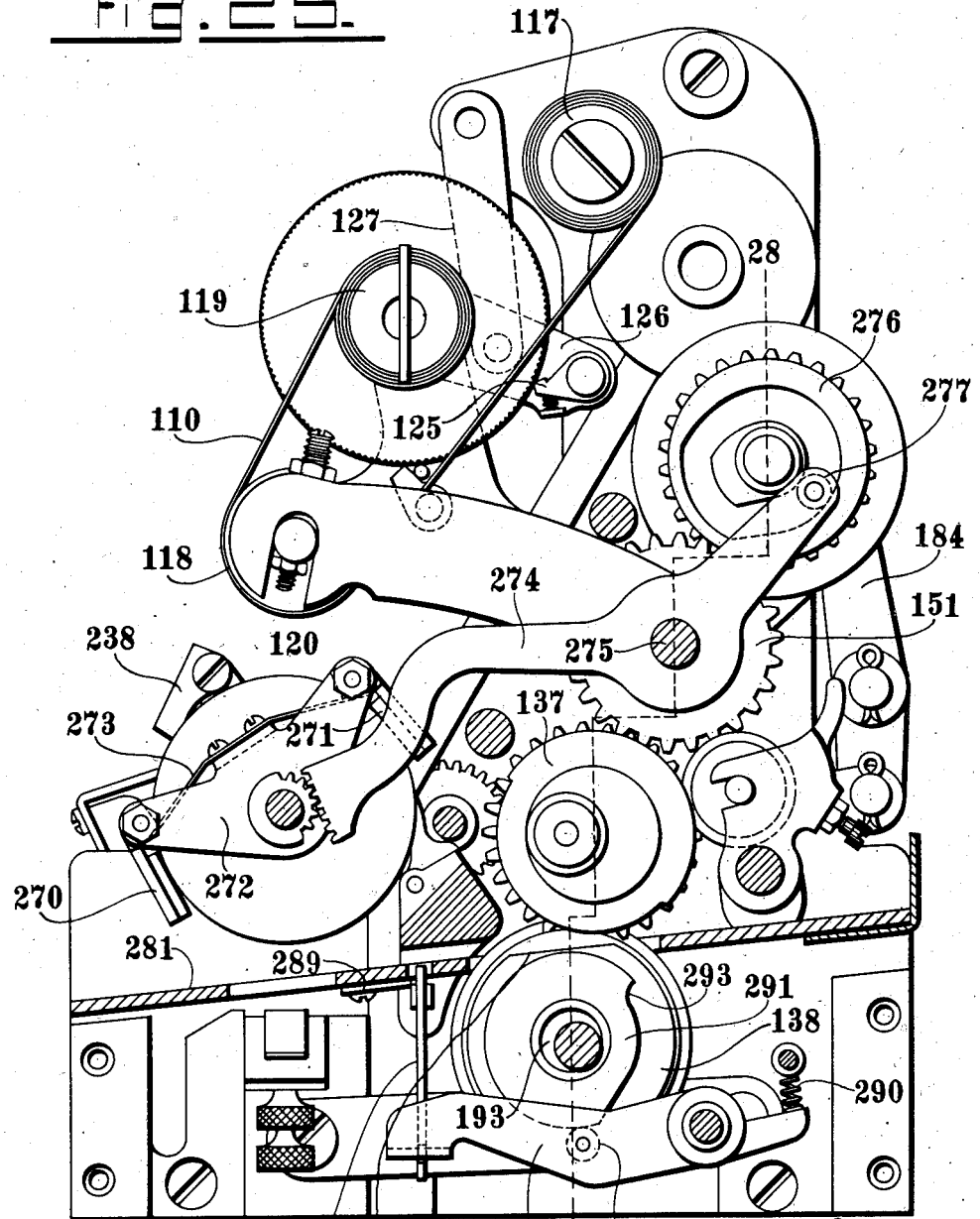

E. J. VON PEIN.
CASH REGISTER.
APPLICATION FILED MAY 26, 1909.
1,096,973.
Patented May 19, 1914.
20 SHEETS—SHEET 15.
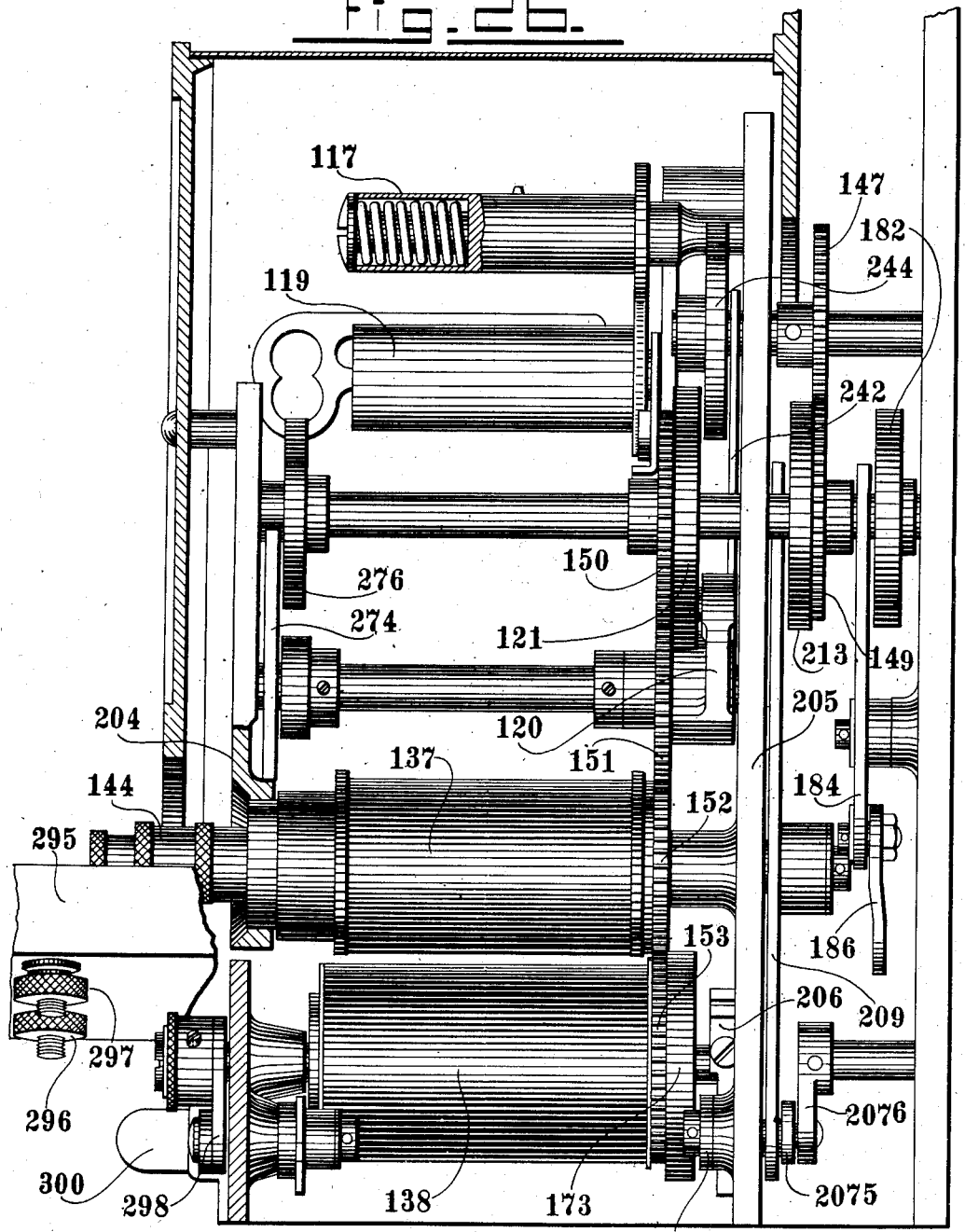

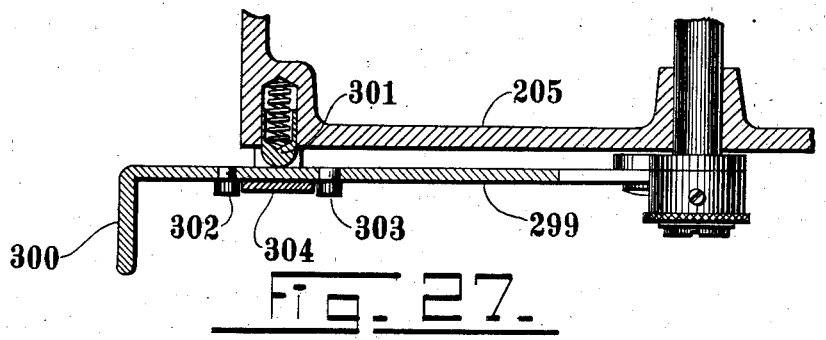
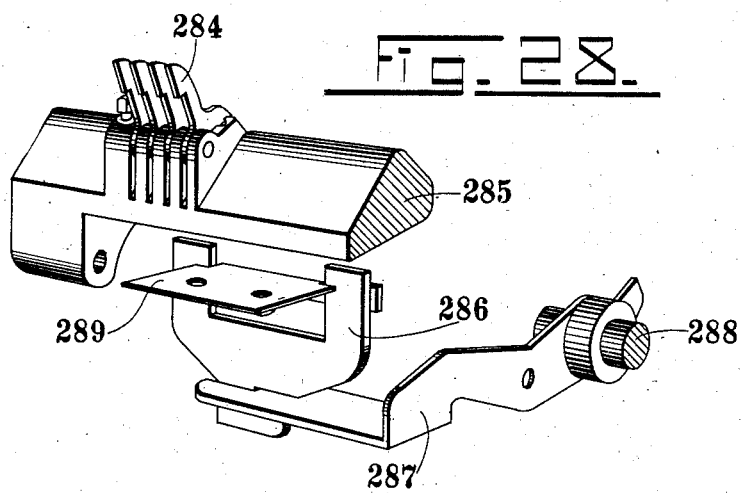
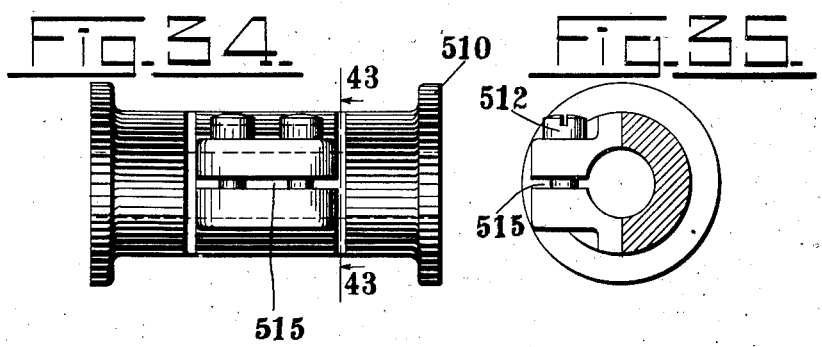

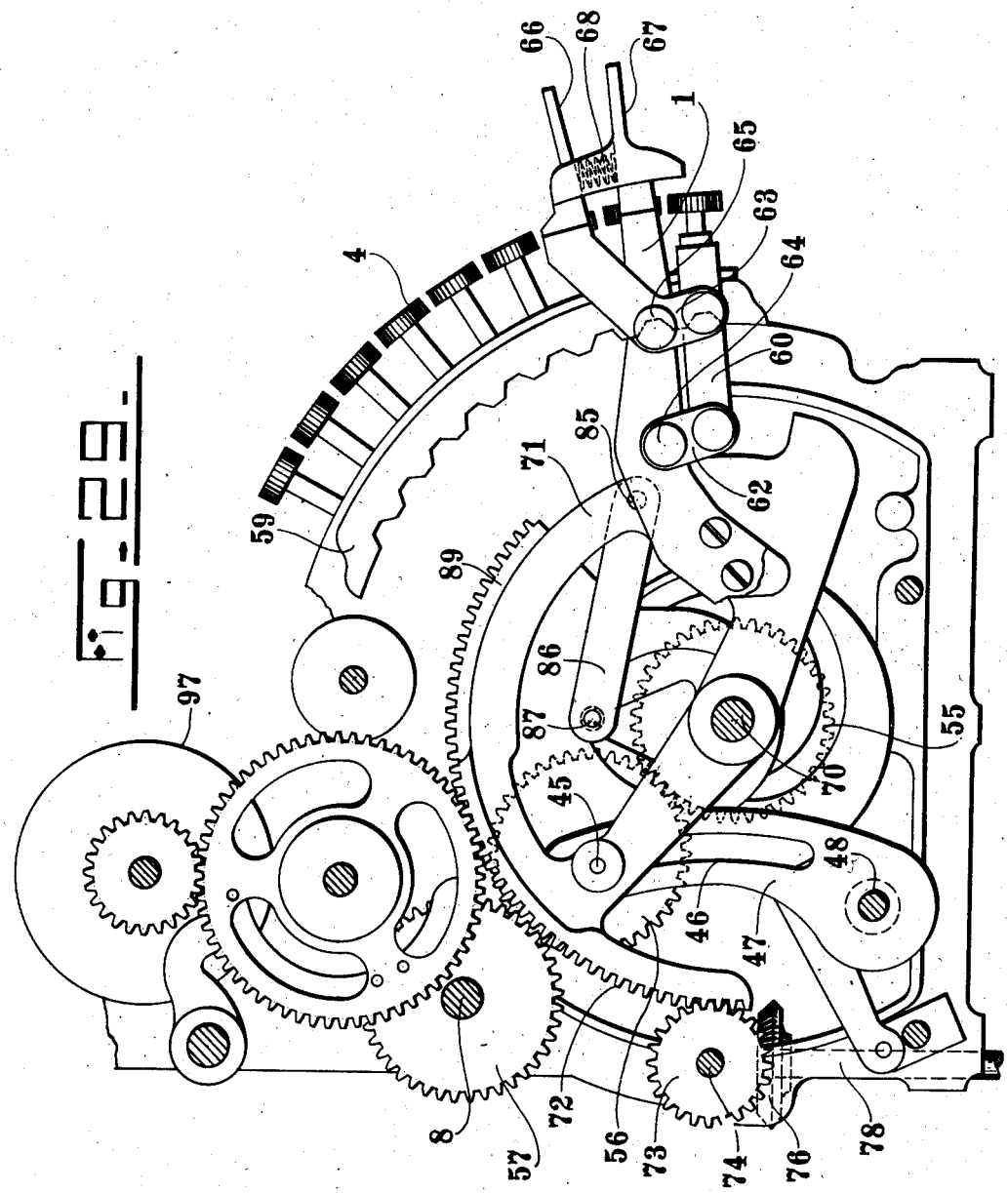

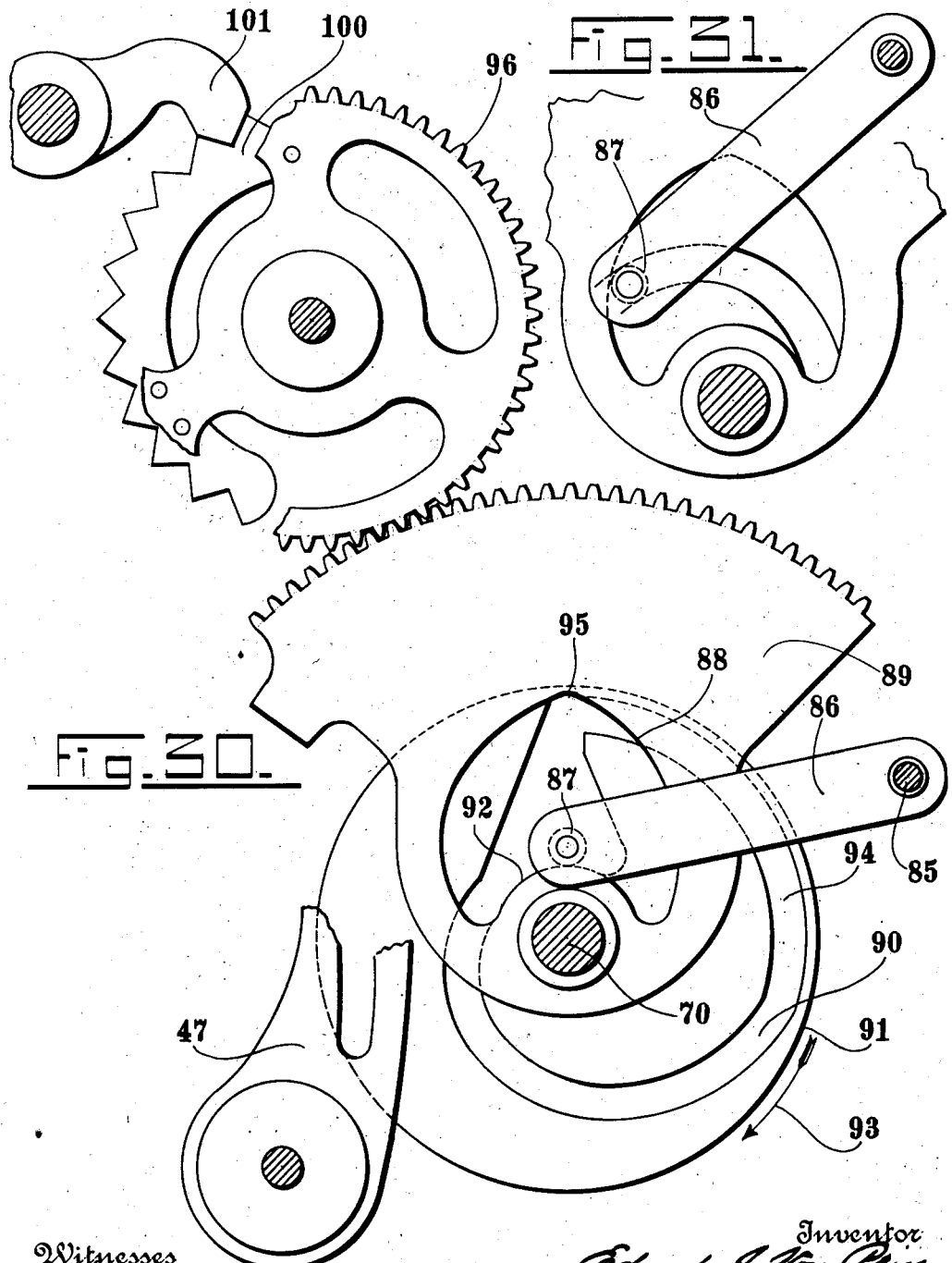

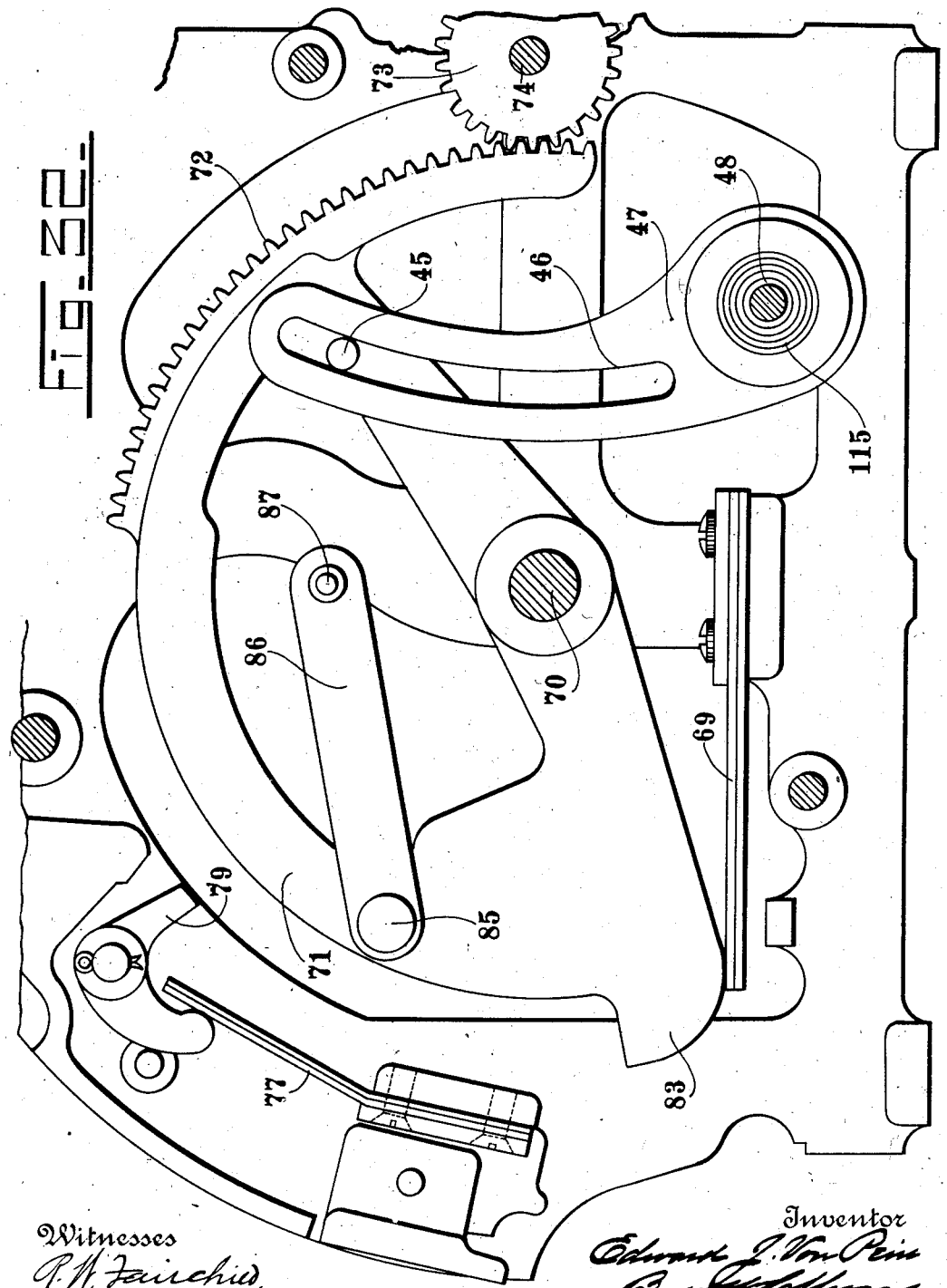

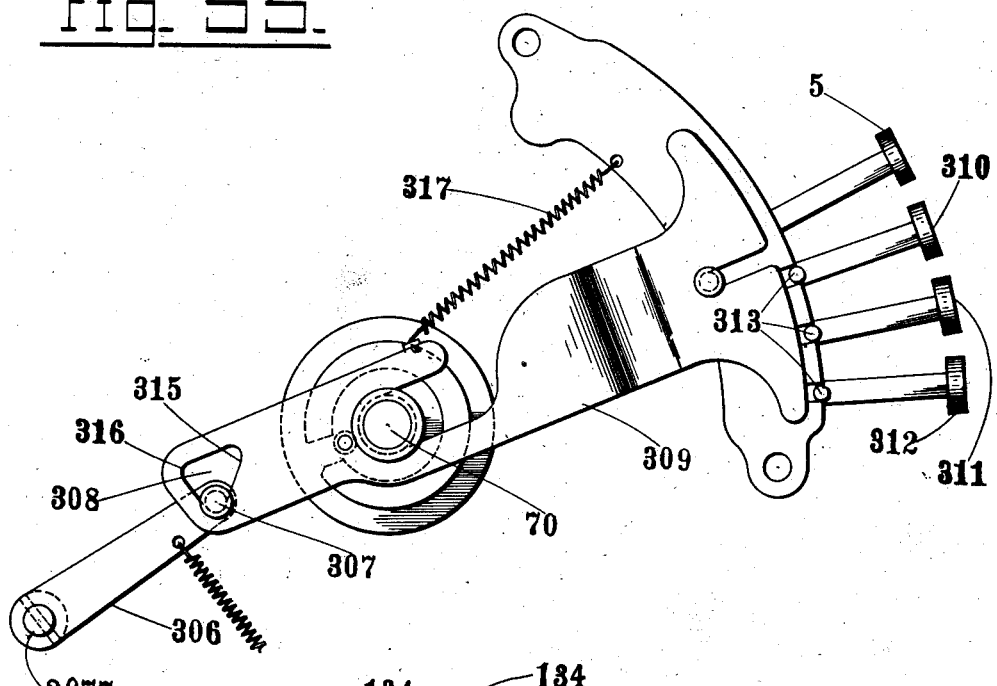

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,096,973.  Specification of Letters Patent.  Patented May 19, 1914.

Application filed May 26, 1909. Serial No. 498,548.

*To all whom it may concern:*

Be it known that I, EDWARD J. VON PEIN, a citizen of the United States, residing at Dayton, in the county of Montgomery and State of Ohio, have invented certain new and useful Improvements in Cash-Registers, of which I declare the following to be a full, clear, and exact description.

This invention relates to cash registers. Among the objects of the invention are to provide an improved check printer for printing both upon the face and back of the check; to provide an improved adjustable alining device for the type carriers of the printer; to provide an improved means for making the printing mechanism inoperative upon certain operations, and to provide an improved inking device for the type wheels.

Another object is to provide an improved numbering device for printing consecutive numbers with records on the check and detail strips.

Another object is to provide an improved drawer releasing device under lock and key and by which the cash drawer may be released without otherwise operating the machine.

Another object is to provide improved indicator setting mechanism controlled by the setting device of the multiple totalizers.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said drawings: Figure 1 is a perspective view of the machine with the cash drawers omitted and the machine cabinet partly broken away. Fig. 2 is a transverse vertical section of the register showing the main operating mechanism. Fig. 2ᴬ is a detail view showing the manually operated shaft for releasing the cash drawers. Fig. 2ᵇ is a detail view showing the plurality of cash drawers. Fig. 3 is a right side elevation of the printing mechanism. Fig. 4 is a transverse vertical section of the printing mechanism taken just inside the right hand printer frame and looking to the left. Fig. 5 is a left side elevation of the printing mechanism on the line 5—5 of Fig. 12 with the shafts which are connected to the operating mechanism of the machine and the machine tie bars shown in section. Fig. 6 is a transverse vertical section of the printer taken just inside the left hand printer frame and looking to the right. Fig. 7 is a transverse vertical section of the printer taken on line 7—7, Fig. 16. Fig. 8 is a vertical longitudinal section of the electrotype roll which prints upon the back of the check. Fig. 9 is a transverse vertical section of the electrotype roll taken on the line 9—9, Fig. 8. Fig. 10 is a longitudinal section partly broken away of the electrotype roll which prints upon the back of the check taken on the line 10—10, Fig. 9. Fig. 11 is a detail of the mechanism for causing the check printing mechanism to become operative or inoperative, and illustrates its control of the type carrier which carries a character which is set to print upon the detail strip when the check printing mechanism is operative. Fig. 12 is a horizontal sectional view of the printing mechanism, taken on the line 12—12, Fig. 3. Fig. 13 is a perspective view of the consecutive numbering device which is also shown in Fig. 12. Fig. 14 is a detail in perspective of the resetting knob of the consecutive numbering device. Fig. 15 is a sectional view of the type carriers taken on the line 15—15, Fig. 12. Fig. 16 is a vertical longitudinal section taken on the line 16—16, Fig. 4. Fig. 17 is a detail of one of the alining pawls for the type carriers. Fig. 18 is a detail of one of the ratchets and a retaining pawl of the consecutive numbering device. Fig. 19 is a transverse vertical section taken on the line 19—19 of Fig. 20 of the impression roll, which forces the check paper into contact with the electrotype roll which prints upon the face of the check. Fig. 20 is an end view of the impression roll shown in Fig. 19. Fig. 21 is a longitudinal section of the ink roll for the electrotype roll which prints upon the face of the check. Figs. 22 to 28 inclusive relate to a modified form of the printer arranged to print upon an inserted slip instead of the strip of check paper. Of said figures: Fig. 22 is a right end elevation of the slip printer. Fig. 23 is a detail in section of part of the mechanism for making the slip printer inoperative. Fig. 24 is a perspective view partly broken away of one of the shafts shown in Fig. 22. Fig. 25 is a transverse vertical section of the printer taken just on the inside of the outside printer frame. Fig. 26 is a longitudinal section of the slip printer taken on the line 28—28 of Fig. 25. Fig. 27 is a sectional view taken on the line 32—32, Fig. 22, illustrating the throwout device for the slip printer. Fig. 28 is a perspective view of a detail of the slip printer mechanism, illustrating how the slip is held against movement while an impression is being made. Fig. 29 is a left end elevation of the register with the multiple totalizers omitted, and some of the shafts shown in section, and shows the lever for setting the multiple totalizers and their corresponding indicator drum. Fig. 30 is a side elevation of the indicator setting mechanism which is controlled by the setting lever of the multiple totalizers. Fig. 31 is a detail of part of the indicator setting mechanism which is shown in Fig. 30. Fig. 32 is a transverse vertical section of the register partly broken away, showing the manner in which one of the type carriers is rotated by means of the multiple totalizer setting lever. Fig. 33 is a detail of the bank of special keys. Fig. 34 is a side elevation of a hub of one of the intermediate gears. Fig. 35 is a sectional view taken through the intermediate gear hub on line 43—43 of Fig. 34. Fig. 36 is a detail of a device to compel proper positioning of certain feeding rollers. Fig. 37 is a fragmentary view of the record strip showing several transactions entered thereon.

The register shown in the drawings is a well known type of cash register, which is fully described in the following patents: No. 703,639, granted July 1, 1902 to Thomas Carroll; No. 754,049, granted March 8, 1904 to Thomas Carroll. In said patents and in this application are shown a machine of the two motion type, having its entries determined by keys in banks, and provided with a rotatable carrier supporting a plurality of totalizers, any one of which may be brought into operative relation with a set of key controlled actuating racks by a hand operated setting arm.

The improvements of the present invention relate to the printing mechanism, and the setting lever for the multiple totalizers with the indicator mechanism controlled thereby, and a new means for releasing cash drawers independently of an operation of the machine. The register itself will, therefore, not be fully described, but its manner of effecting a registration and the main elements of the machine will be briefly described.

In registering a cash sale, the operator adjusts the multiple totalizer lever 1 (Fig. 1), to bring his particular totalizer of the multiple totalizers 2 into operative relation with their actuating devices 3, and depresses the amount keys 4 representing the amount to be registered, and then depresses the cash key 5 by means of which the machine is finally released. A main drive shaft 8 is then caused to make one rotation either by means of a motor or from a crank handle journaled on the stub shaft 36, (Fig. 1) and geared to shaft 8 (Fig. 2), and in doing so causes segment gears 7 of the differential mechanism to move upwardly distances which are regulated by the particular keys depressed. The segment gears 7 are loosely journaled on a shaft 12, and the main drive shaft 8 is connected by a crank 9, link 10 and arm 11 to the shaft 12, which shaft carries a plurality of segments 13, one for each segment gear. The shaft 8 through the lever and link connection causes the shaft 12 to oscillate to carry the segments 13 first downwardly bringing the shoulders 14 of the segments opposite shoulders 15 of plungers 16 and then upwardly to the position shown in Fig. 2. The plungers 16 are hung from links 27 and 28, which are pivoted at 29 and 30 to the segment gears 7, and the depression of any key will permit the plunger 16 of the segment gear of its respective bank to rock rearwardly to engage the shoulder 14 of the segment 13, when the segment 13 reaches its lowest position. The depression of a key permits movement of the plunger 16 by raising a detent plate 17 out of the path of a slide 18, which is then drawn rearwardly by a spring 19, thus carrying a projection 20 of the slide 18 away from a pin 21 on the plunger 16. The plunger is then free to rock rearwardly under the action of the spring 22, which bears between a lug 23 on the segment gear 7 and a lug 24 on an arm 25 which is pivoted to the segment 7 on a pin 26, and carries the plunger 16 at the pivot 21. Pawls 31 prevent the segments 7 from being accidentally carried upward when no keys of their respective banks have been depressed. Shoulders 32 of the pawls 31 are normally in the paths of the plungers 16, but if keys have been depressed in the respective banks for such plungers, the plungers will be rocked rearward out of the path of the pawls 31. The arms 25 which carry the plungers 16 also carry pawls 33 which are located in the planes of the keys and will engage the shanks of depressed keys when the segments 7 are rocked upward. Upon the engagement of one of the pawls 33 with a depressed key, the arm 25 is rocked around its pivot 26 to carry its respective plunger 16 into one of the notches 34 and at the same time disengages the plunger 16 from the segment 14, and, therefore, the segment 7 from the segment 14.

The main totalizer 6 and the indicators 35 are differentially rotated the required extents by merely transmitting the differential rotation of the segments 7 to such devices by means of the gears 37 and 38. The totalizer pinions are driven through intermediate pinions 40, meshing with the gears 38 when the same are rotated forward, and the pinions 39 which are rigidly secured to the indicator drums 35 mesh with the gears 37. The intermediate gears 40 are carried by a frame 43 which is pivoted to the frame of the machine at 44. Mechanism which is not shown in the drawings causes the said frame to rock forward disconnecting the totalizer from the gears 38, when the segments 7 come to rest in their upper positions. Then on the beginning of the next succeeding operation of the machine, the segment gears 7 are rocked forward to their zero positions without effecting the setting of the totalizer, but as the segments 7 are still in mesh with the gears 37, the indicators 35 will be returned to their zero positions. The segments 7 carry pins 45, which extend through slots 46 in arms 47, which are carried by a shaft 48 and the concentric sleeves 115. The slots 46 are disposed at an angle to the path of the pins 45, so that when the segments 7 are rocked, the arms 47 will be correspondingly rocked. The sleeves or tubes 115, upon which the arms 47 are mounted, extend through to the right hand side of the machine and there carry segment gears 49 (Fig. 5), which segments mesh with pinions 50, mounted upon small concentric tubes upon which are also mounted type wheels 51 (Fig. 12). By this mechanism, the type wheels are differentially rotated, as desired, upon each operation of the machine. When the segments 7 are returned to their zero positions, upon the beginning of an operation, the type wheels 51 will also be returned to their zero positions.

The gears 37 are mounted on concentric sleeves 42 and cash sales are registered upon the clerk's totalizers by means of the segment gears 3, which are carried by the other ends of the sleeves 42, the differential rotation of which has already been described. The clerk's totalizers 2 are carried by a rotatable reel 53 which is rotated by means of the clerk's totalizer setting level 1, to bring any desired totalizer opposite the segments 3. At the proper time the reel 53 is moved upward in a substantially vertical plane to mesh the selected totalizer with the segments 3. For this reason the clerk's totalizer reel is journaled in a sliding frame 54. The cam which raises and lowers the reel is not shown in the drawings, but it is described in the before mentioned patents. These patents also describe how movement of the setting lever 1 causes rotation of the reel 53.

The setting lever 1 is alined in any one of a plurality of positions by an alining plate 59, (Fig. 29), and the plunger 60 of the setting lever. There are nine notches in the plate 59 in this case as the reel 53 carries nine clerk's totalizers 2. The plunger 60 is carried by arms 62 and 63, which are pivoted to the setting lever 1 on pins 64 and 65. The arm 63 extends forwardly (see Fig. 29), terminating in a handle 66, which, when pressed toward the handle 67 of the setting lever, rocks the member 63 around its pivot 65 to carry a lug on the plunger 60 out of engagement with the alining bar 59. The lever may then be rocked to any desired position, and upon the release of the handle 66, will be alined in its set position as the handle 66 is spring pressed by a spring 68, normally urging the plunger 60 into engagement with the alining bar 59.

A segment gear 71 to which the setting lever 1 is securely fastened is loosely journaled on a short shaft 70, which is journaled at the left shaft 12 (Fig. 2) and concentrically thereto. The segment gear is provided with the gear teeth 72 which mesh with a pinion 73 mounted on a shaft 74, which also carries a bevel gear 75 arranged to mesh with a companion bevel gear 76 splined upon a vertical shaft 78. The shaft 78 carries cash drawer selecting devices described in Patent No. 616,866 issued to W. F. Bockoff, December 27, 1898, comprising fingers extending at different angles from the shaft, and upon the operation of the machine the shaft 78 is lifted vertically by a pitman 80 (Fig. 2), which is actuated by a cam 81 carried by the drive shaft 8. The shaft 78 extends through an opening in the pitman and is provided with a cotter pin 82, by means of which the shaft is lifted by the pitman 80. With this mechanism, upon the setting of the clerk's totalizer reel a corresponding one of the cash drawers will be selected to open upon the operation of the machine.

The segment gear 71 (Figs. 29, 30 and 31,) has pivoted to it on a pin 85, a link 86, which carries a roller 87, extending through a heart shaped opening 88 in a segment gear 89 and into a groove 90 in a cam 91. The groove 90 of the cam 91 is concentric at the point marked 92 with the shaft 70, upon which the cam 91 is mounted, and this part of the cam groove is in the position shown in Fig. 30, when the cam 91 is in its home position. The lever 1 is arranged to be set only when the cam 91 is in its home position. Therefore, when the lever 1 is set, the roll 87 will be correspondingly angularly set with respect to the shaft 70. The shaft 70 is geared to the drive shaft 8 by a train of gears 55, 56 and 57, and is, therefore, caused to make one revolution at each operation of the machine. It rotates in the direction indicated by the arrow 93 and, upon the rotation of the shaft 70, the cam 91 will cause the roller 87 to be carried away from the shaft 70 an extent corresponding to the radial distance of part 94 of the cam groove from the shaft 70. If the apex 95 of the opening 88 in the segment gear 89 happens to be in the path of the roller 87, when the same is moved upwardly, the segment gear 89 will not be moved upon the upward movement of the roll 87, but if the apex 95 of the opening 88 is not in the path of the roll 87, the roll will engage one or the other of the sides of the opening 88 and cam the segment gear 89 to one side or the other according to the position to which the roll 87 is brought upon the setting of the lever.

The segment gear 89 meshes with an intermediate gear 96, which in turn meshes with a pinion 39 secured to an indicator drum 97 (Fig. 1), which carries two sets of nine characters for reading from the front and the rear of the register and which characters, when opposite openings in the cabinet at the front and rear of the indicator, indicate the particular totalizer which is operatively connected to the actuating segments 3. The intermediate gear 96 is provided with a serrated disk 100 which is engaged by a pawl 101 to aline the indicator when it is set. In the before mentioned patents the clerk's indicator is set directly by the lever 1. One object of the construction of indicator setting mechanism which is here described is to have the main drive of the machine perform the work of setting the indicator and for this reason lighten the action of the lever 1. It will be clear that a clerk cannot change the exhibited indication by a mere movement of the setting lever 1, but must also operate the machine. This prevents a clerk from fraudulently operating the machine with another clerk's totalizer in mesh with the driving devices, and then at the conclusion of the operation quickly shifting the lever to bring his own totalizer into register. If the clerk's indicator was directly operated by the setting lever, such a scheme might be possible, but with the construction described, the clerk's indicator will point out the totalizer actually operated. It is immaterial in what position the segment gear 89 is left after an operation of the machine, as the same will be positioned upon the next operation of the machine according to the angular position of the roll 87 with respect to the shaft 70 before the shaft 70 is rotated. As shown, these parts are adapted to position what is known in the art as an indicator, that is, a device for exhibiting to an observer any one of a plurality of indicia. Other types of accounting mechanism known in the art might be employed in connection with this positioning mechanism, and it is, therefore, to be understood that except where the terms of the claims require it, the claims are not to be limited to the indicating device shown, but include other types of accounting mechanism.

It is to be especially noted that this mechanism provides a directly set accounting device, that is, one in which the accounting or indicating element is not restored to normal position at or between each operation.

The segment 71 carries a pin 45 which extends into a slot 46 in an arm 47, and the slot 46 is disposed at an angle to the path of movement of the pin 45. Therefore, when the segment 71 is rocked around its pivot 70 it will cause the arm 47 to be correspondingly rocked from its pivot 48. The arm 47 is rigidly secured to shaft 48 which extends through to the printing mechanism at the right hand side of the machine. It there carries the segment gear 102 (Fig. 12), which meshes with a pinion 103 mounted upon a sleeve 104, which sleeve carries a clerk's type wheel 105.

The springs 69 and 77 (Fig. 32) serve to cushion or prevent jarring of the clerk's reel and setting mechanism in case the lever 1 is violently rocked to either of its extreme positions. The segment gear 71 to which lever 1 is fastened, is provided with a lug 83 which engages the cushioning device when the segment gear is moved to its extreme positions. When the lever 1 is in its highest position, the lug engages a bell crank 79, which bears against spring 77 and in the lowest position of lever 1 it engages the spring 69.

The shaft 78 may be lifted for the purpose of opening a cash drawer independently of an operation of the machine by means of a lever 3200 (Fig. 3), which is fixed to a shaft 3210 carrying an arm 3220 (Fig. 2^A), which extends across the lower side of a roll 323, carried by the pitman 80. By rocking the lever 3200 downwardly, the arm 322 engages the roll 323 causing the pitman to raise the shaft 78 and release the cash drawer with which the shaft 78 is, at the time, in operative relation, as determined by the setting of the lever 1. Access to lever 3200 may be had only through a door 324 of the printer hood or casing 325. This door is provided with a lock for the purpose of preventing others than the owner of the machine or one authorized from opening a cash drawer without operating the machine.

*Printing mechanism.*—The printing mechanism is illustrated in Figs. 1 to 21 inclusive and is arranged to print the amount of each recorded transaction upon a detail strip 110 and on a check strip 111. (Fig. 7). It also prints at the side of the amount, an initial which corresponds to the particular clerk's totalizer which is operated, a special character which indicates whether the sale is a "cash" sale, "received on account", "charge" or "paid out", and the consecutive number of the transaction. It also prints the date of the transaction, and other matter, such as advertising on the front and back of the check strip. Fig. 7 shows the general arrangement of the printing mechanism. The amount, special and clerk's type wheels are carried by the concentric sleeves 112, to which sleeves the pinions 50 (Fig. 5) are rigidly secured. These pinions, as before stated, mesh with small segment gears 49, which are carried by the shaft 48 and concentric sleeves 115. The shaft 48 is differentially rotated by means of the setting lever 1, as previously described, and the sleeves are differentially rotated by the segment gears 7, which are controlled by the banks of amount keys, and the bank of special keys.

The detail paper (Fig. 7) is led from a supply roll 117 around a platen 118 to a receiving roll 119. The platen 118 is carried by the arms 120, which are actuated by a cam 121 (Fig. 6), which acts upon a roll 122, carried by one of the arms 120. When the platen 118 is rocked downwardly to press the detail strip 110 against the type wheels at 123, the roll 117 is caused to rotate slightly against frictional resistance by the tensioning of the detail strip 110. Upon the return of the platen 118, the slack of the detail strip 110 is taken up by the roll 119, which is carried by a shaft 124, mounted in the platen frame arms 120, the roll 119 being rotated for this purpose when returning to its upper position by a pawl 125. The pawl 125 is carried by an arm 126 (Fig. 5), mounted upon the shaft 124, which arm is pivotally connected to an arm 127 pivoted to the frame of the printer on a pin 128 and pivoted to the arm 126 by a pin 129. The pawl 125 engages a serrated disk 130, which is rigid with the roll 119, and when the platen is moved downwardly will idly move over the serrations of the disk 130, but when the platen is returned to its upper position, the pawl 125 engages the disk 130, and causes rotation of the receiving roll 119.

The check strip 111 is led from a supply roll (not shown in the drawings), through a guide 132 (Fig. 7), between an electrotype roll 133 and an impression roll 134, and down through guides 135 and 136, between an electrotype roll 137 and an impression roll 138 and from there over a knife 139, between the type wheels 51 and a platen 140 and out of the printer through an opening 141.

The type wheels 51 carry two similar sets of type, one for printing upon the detail strip and the other for printing upon the check strip. The electrotype roll 133 prints advertising matter or the like upon the rear of the check strip, and the electrotype roll 137 prints the date and other desired matter upon the face of the check strip. The electrotype rolls are inked by ink rolls 142 and 143, which are rotated by frictional contact with the rolls 133 and 137 (see Figs. 4, 7 and 12). The ink rolls are carried by spring pressed pivoted frames 278 and 2785 (Fig. 4), which serve to hold the ink rolls in proper contact with the electrorolls 137 and 133. In order to remove the ink roll it is merely necessary to swing the frames rearward by means of handles 279, (see Figs. 4 and 6) rigid with the frames. The ink rolls may then be lifted out of the slots 280 in the frames. Fig. 21 illustrates the construction of the ink rolls which comprise a cylindrical perforated ink receptacle 145, a stopper or cap 146 and a felt covering 1425. The dating wheels which are carried by the roll 137 are not illustrated in the drawings but the same are set by means of the knurled heads 144 (Fig. 12).

The rolls 133, 134, 137 and 138 are caused to rotate once upon each operation of the machine and are driven by a train of gears (Figs. 2, 4, 5, 7 and 16) 147, 148, 149, 150, 151, 152, and 153, which gears receive motion through drive shaft 8 from a pinion which is carried by a sleeve surrounding the stub shaft 36, upon which the operating handle is mounted.

The check strip 111 is fed the desired amount upon each operation of the machine by flanges 158 and 159 which are carried by the electrotype rolls 133 and 137, and engage co-acting surfaces on the impression rolls. The rotation of the rolls 133 and 137 causes the same to be inked as they contact with the ink rolls and to feed the check strip and to print upon the same.

The check platen 140 is carried by a block 160, which is mounted upon arms 170, pivoted at 171 to the frames 204 and 205. The arms 170 are rocked upwardly at the proper time to take an impression by cams 173, which act upon rollers 174 carried by the arms 170. The block 160 also carries a knife 139 which cuts the printed portion of the check from the remainder of the strip upon the rise of the platen. The arrangement of the rolls 133 and 137 and the type carriers 51 is such that when the type carriers 51 are printing on a check to be issued upon a particular operation, the roll 137 will be printing on the check which will be issued upon the next operation of the machine and the roll 133 will be printing on the check which will be issued upon the second following operation.

The type carriers 51 are alined by pawls 175, which are loosely mounted on a shaft 176 (see Figs. 5 and 17) and are spring pressed into engagement with the gears 50 by springs 177. The pawls 175 are rocked out of engagement with the gears 113 to allow the setting of the type wheels by a bent frame 178, which hooks over all of the pawls 175 at their shoulders 179 and which is carried by arms 180 and 181 pivoted at 176, and is actuated at the proper times by a box cam 182, which operates upon a roll 183 carried by a lever 184, pivoted at 185 to the frame of the printing mechanism and connected to the arm 181 by the link 186. The pawls 175 may be individually rocked out of engagement with their respective gears 113 by hand, thus permitting the rotation of the type wheels 51 properly to set the same when the machine is first assembled. The pawls 175 are each carried by circular disks 190, which are eccentrically and loosely mounted upon the shaft 176, and which carry serrated disks 191. The disks 191 are normally prevented from rotating by springs 192 which engage the serrations of the disks 191, but may be rotated by hand and when rotated will cause the eccentrics 190 to raise or lower their respective alining pawls 175. This manner of mounting the pawls 175 provides for a very accurate adjustment of the alinement.

Figs. 19 and 20 are details of the impression roll 138. The roll 138 rotates upon the circular supports 193 and 194 which are carried eccentrically by a normally non-rotating shaft 195. The gear 152 by means of which the impression roll 138 is rotated, is not mounted on the shaft 195, but is rigidly secured to the impression roll itself by the pins 1525. The shaft 195 is provided with a knurled head 196 which carries a pin 198 extending in a groove 197 in the shaft 195, and by drawing the knurled head slightly outward and then rotating it, the shaft may be slightly rocked so that the eccentrics 193 and 194 will carry the impression roll 138 into or out of contact with the electrotype roll 137, and by this means cause the two rolls to grip or not grip the check paper thus making the printing mechanism inoperative or operative, as desired. The teeth in the gears 152 and 153 are of sufficient length to remain in mesh when the roll 138 is moved away from the roll 137. The roll 138 will, therefore, rotate even when the check strip is not fed, and the cams 173 still operate the platen, but as the cams 173, by virtue of their slot and pin connection with the rollers, as shown in Figs. 19 and 20, do not lower, they will lift the platen high enough to cause it to effect printing, for instance, on an inserted slip substituted for the check. The knurled head 196 is provided with a hole at 199 to receive a pin 200, which extends from an arm 201 rigidly fastened to the side frame of the printer. In order to rotate the knurled head 196 it is necessary to draw the same outward a slight distance to disengage it from the pin 200 and in its moved position, the pin 200 will enter another hole similar to the hole 199 and prevent the knurled head from being accidentally moved out of its set position. A spring 202 urges the knurled head into engagement with the pin 199.

When the knurled head is in its inner normal position, the pin 198 is situated opposite an annularly extending groove 203 in the shaft 195 and, therefore, does not prevent oscillation of the shaft 195 independently of the knurled head as is done by the machine itself when operated in a certain manner. For instance, it is desirable to issue a check regardless of the setting of the knurled head 196 whenever the "charge," "paid out", or "received on account" key is depressed, the check serving as a memorandum of the special transaction. When cash sales are recorded, the operator may by manipulation of the knurled head make the check printing mechanism operative or inoperative as he desires, as in such cases the issuing of a check is not imperative.

Before describing how the special keys control the check printing mechanism, the manner of causing the electroroll 133 and impression roll 130 to become inoperative at the times the rolls 137 and 138 are made inoperative will be described. The shaft 195 is journaled in the frames 204 and 205 of the printer and adjacent to the frame 205, as shown in Fig. 16, it carries an arm 206, which is provided at its lower end with a pin 207 extending through a slot 208 (Fig. 11) in a lever 209, which is fulcrumed at 210 to the frame 205. The lever 209 is connected by a link 216 with an arm 217, which is rigid with a sleeve 218 surrounding a shaft 219, and which sleeve carries eccentrics 220 and 221 (Figs. 8 and 11). The electroroll 133 which prints upon the back of the check strip is journaled on the eccentrics 220 and 221. When the shaft 195 is rocked in the direction indicated by the arrow 214, the link connection 216 causes the eccentrics 220 and 221 to rock upon the shaft 218 in the direction indicated by the arrow 223 and thereby cam the electroroll 133 away from the impression roll 134 so that the flanges of the electroroll 133 will not contact with the impression roll when the electroroll and impression roll are rotated upon the operation of the machine and accordingly the check paper will not be fed. The lever 209 carries a roll 211 at its upper end which roll is adapted to enter a groove 212 in a cam 213 on a shaft 215 or to be carried out of the groove of the cam when the shaft 195 is oscillated. If by means of the knurled head 196 or by one of the special keys, as will be described, the shaft 195 is rocked in the direction indicated by the arrow 214, (Fig. 11), the lever 209 will be rocked through its connection with the shaft 195 to carry the roll 211 out of the groove in the cam 212. Then when the shaft 215 is rotated upon the operation of the machine by gear 149, fast thereon, the roll 211 and consequently the arm 209 will be held positively in its moved position, and the check paper will not be printed upon or fed. When the roll 211 is in the groove 212 of the cam it will be held in such position, as shown in Fig. 11, during the rotation of the shaft 215 at the time the check strip is being printed upon and fed. By rotating the shaft 195 in the direction indicated by the arrow 214, the impression roll 138 is moved away from the electroroll 137, which prints upon the face of the check and the same movement of the shaft causes the electroroll 133 to be moved away from the impression roll 134. Therefore, feed of the paper is simultaneously prevented at both the front of check printer and back of check printer. If the shaft 195 is returned to the angular position in which it is shown in Fig. 11, both of the check printing devices will be operative and cause the feed of the paper.

The lever 206 is connected at its upper end to an arm 227 by a link 228. The arm 227 is rigidly secured to the shaft 229 to which is also fastened a small segment gear 230. The segment gear 230 meshes with teeth 231 of a type carrying member 232, which type carrier carries a type at the point 233. The type carrier 232 is shown in Fig. 11 with the type 233 at the printing point, and if an impression were taken with the type at this position, the type would print a character upon the detail strip indicating that a check had been issued upon such operation of the machine. If the shaft 195 is rocked in the direction indicated by the arrow 214, it pushes up upon the link 228 causing the same to rock the segment 230, which meshes with the type carrier 232 and move the type carrier so that the type 233 will be carried away from the printing line and no impression of the type will be made upon the detail strip.

The shaft 195 may be oscillated to cause the front and back of check printers to become operative or inoperative by means of the special keys. This mechanism is illustrated by Figs. 11 and 33. The pin 207 which is carried by the lever 206, extends through the lever 209, and at the opposite side of the lever 209 it is secured to a link 2075, which connects to a lever 2076. This lever is rigidly secured to a shaft 2077, which shaft is, therefore, rocked by the rocking of the shaft 195 and the shaft 2077 carries an arm 306 (Fig. 33), which is provided with a pin 307 extending through an opening 308 in a slide 309. The slide 309 is pushed rearward upon the depression of the "received on account" key 310, the "charge" key 311, or the "paid out" key 312, as these keys carry pins 313 extending across the forward edge of the slide, and when pushed rearward the edge 315 of the opening 308 cams the arm 306 upward, thereby through shaft 2077, arm 2076 and link 2075, rocking shaft 195 to the position to which it must be moved in order to make the check printing mechanism inoperative, that is, provided the shaft 195 is not in such position at the time the special key is depressed, in which case the pin 307 would be at the point 316 of the opening 308. The backward movement of the slide would not then cause the shafts 2077 and 195 to rock. Upon the release of the depressed special key the slide is returned to its normal position by a spring 317. The cash key 5 is not provided with a pin 313 and, therefore, its depression does not alter the setting of the check printing mechanism.

The printer is provided with a consecutive numbering device for printing upon both the check and detail strip at the sides of the records of amounts, which is illustrated in Figs. 6, 12, 13, 14 and 15. The numbering device comprises the four type wheels 234 which are carried by the ratchets 236. The ratchets 236 are each connected to a particular type wheel and each is provided with a deep notch 237 of successively decreasing depth from the lowest denomination to the highest denomination. The ratchets are operated by a multi-pronged pawl 238, pivoted to an arm 239, which is integral with a sleeve 240 (Fig. 6). The sleeve 240 is provided with an ear 241, to which is pivoted a pitman 242. The pitman 242 is forked over the shaft 8, which shaft makes one rotation upon each operation of the machine and carries a cam 244, into a groove of which extends a roller 245 on the pitman. The pitman will, therefore, be reciprocated in a lineal direction once upon each operation of the machine. It thus causes the arm 239 to carry the multiprong pawl 238 far enough to cause the disk 236 of lowest order to move one tooth space. The so-called deep notch transfer is well known and need not be described in detail.

Figs. 14 and 15 illustrate how the consecutive numbering device is turned to zero. A knob 255 by which the consecutive numbering device is returned to zero is mounted upon a shaft 256, which shaft carries a gear 257, meshing with a gear 258, which is secured to a sleeve 259 upon which the ratchets 236 are loosely journaled. The sleeve 259 is notched at 260 and 261 (Fig. 15), which notches extend across all of the ratchets of the numbering device. Each ratchet carries a pawl 262 which is spring pressed toward the sleeve 259. The pawls 262 are pivoted in seats 263, which are cut into the sides of the type wheels of the numbering device. The knob 255 is secured to the shaft 256 by a pin 264 which extends through the shaft 256 into a notch 265 in the knob. The knob 255 is also notched as shown at 266 to receive a pin 267 which is secured to the frame 205 and is urged by a spring 268 toward the frame 205 so that the pin 267 will normally be in the slot 266. In order to rotate the shaft 256, the knob 255 must first be pulled slightly outward to disengage it from the pin 267, and by then rotating the knob 255 to the right, the shaft 266 will rotate to the right and as this shaft carries the gear 257 meshing with the gear 258 which is secured to the sleeve 259, the sleeve 259 will then be rotated to the left in the direction indicated by the arrow 269, (Fig. 15). As the sleeve rotates it picks up the pawls 262 when either the notches 260 or 261 reach the pawls, and causes the pawls 262 and the type carriers 234 to which they are secured to rotate with the sleeve 159. When the shaft 256 has made a complete rotation, the slot 266 in the knob 255 reaches the pin 267 and the knob will then spring inwardly if permitted and prevent further rotation of the shaft. The complete rotation of the shaft 256 causes a half rotation of the sleeve 259 which is enough to carry the type wheels 234 to their zero positions as the type wheels carry two sets of type the same as the regular amount type wheels for printing both upon the detail strip and the check strip. When the sleeve 259 is rotated by means of the knob 255, the type wheels of the numbering device are rotated in the same direction in which they are rotated by the multi-pronged pawl 238. The type wheel 234 of highest order is broader than the others in order that it may carry the abbreviation "No." at the point where the other type wheels have the cipher character.

The type wheels 123 and 234 are inked by pads 270 and 271 (Figs. 3, 4, and 7). These pads are carried by the member 272, which is pivoted concentrically with the type wheels and has two oppositely extending arms to each of which is pivoted one of the ink pads. The ink pads 270 and 271 are normally held away from the type wheels by a spring 273 which engages squared sides of both of the carrying arms of the pads. After the type wheels are set for printing, the member 272 is rotated to carry both of the pads into a vertical plane extending through the axis of the type wheels. The platens are then moved toward the type wheels enough to press the pads against the wheels. The pads are then returned to their initial positions, and the platens after a slight elevation continue the movement toward the type wheels to cause an impression to be made. The member 272 is oscillated by means of a lever 274, best shown in Fig. 4, which lever is pivoted at 275 and is actuated by a cam 276 which acts upon a roller 277 carried by the arm 274 to oscillate the arm at the desired times.

The arm 274 is provided with teeth 2745 meshing with the pinion 2725 which is rigid with the member 272.

The carrying arms for the ink pads 270 and 271 are provided with oppositely extending ears 320 and 321 (Fig. 3), which are connected together by a link 322. Therefore, by pressing one of the pads against the type wheels the other one will also be drawn against the type wheels. For this reason the initial movement of one of the platens will serve to cause the type wheels to be inked upon both sides. This construction is also serviceable both for the purpose of facilitating the insertion of new ink pads and the cleaning of the type wheels. By rocking one of the pad holders outwardly the other pad will also be rocked outwardly, the spring 273 serving to retain the pad carriers in either their normal or their moved position by engagement with the squared sides referred to.

*Slip-printer.*—Figs. 22 to 28 inclusive illustrate a modified form of printer which is adapted to print upon an inserted slip in place of the strip of check paper. This printer is practically the same as the printer just described except that it is not provided with the back of check printer and has a few modified parts which make it more suitable for printing upon an inserted slip. As the greater part of the mechanism of this modified form of printer is identical with that of the regular printer, the same reference numerals have been applied in the drawings to parts which are duplicates of parts of the regular printer. The difference between the two printers is principally in that the slip printer is provided with a table 281 (Figs. 22 and 25), upon which the slip to be printed rests. The slip is inserted between the electroroll 137 and the impression roll 138, which is cut away at 1385 to permit the insertion. The platen 140 of the slip printer is operated at the same time and in the same way that the platen for the check printer is operated, and before the operation of this platen, the rolls 137 and 138 grip the paper and feed the same part way out of the printer, at the same time printing whatever matter is carried by the electroroll 137.

Pawls 284 which prevent backward rotation of the consecutive numbering wheels, are carried by a transverse bar 285 which also serves as a clamping member for preventing movement of the inserted slip after the platens begin to move to take impressions. Beneath the bar 285 (Figs. 25 and 28) is located a U-shaped member 286 which is carried by an arm 287 pivoted at 288 and is guided in a vertical direction by a guide 289 which is secured to the lower side of the platform 281. The arm 287 is normally urged by a spring 290 (Fig. 25) to carry the U-shaped member 286 into engagement with the bar 285, but is normally prevented by a cam 291, which engages a roll 292 carried by the arm 287. When the drive shafts of the machine have made about one half of a rotation, the cut away part 293 of the cam 291 arrives opposite the roll 292, at which time, the arm 287 springs upward and clamps the slip in place. An impression is then made after which the cam 291 returns the clamp 286 to normal position, permitting the removal of the printed slip.

The platform 281 is provided with an adjustable paper gage 295 (Fig. 22). This gage is held in its set position by the thumb screws 296 and 297.

The electrotype roll 137 of the modified printer may be made inoperative by rotating the eccentrics 193 to carry the impression roll 138 away from the electrotype roll 137. The eccentrics may be rocked by the slide 299 (Fig. 22), which slide is provided with a handle 300 and is pivotally connected at its rear end to an arm 298, which is secured to the shaft 195 upon which the eccentrics 193 are mounted. The slide 299 is shown in section in Fig. 27. It is loosely pivoted to the arm 298 so that it may be rocked in a transverse direction, against the spring pressed plunger 301, which is mounted in the side frame 205. The rolls 302 and 303 which are carried by the slide 299, extend across the sides of a bracket 304, which is screwed to the side frame 205, and in order to slide the member 299 in a longitudinal direction, it must first be rocked inward against the plunger 301 to move the pins 302 and 303 clear of the bracket 304. It may then be slid longitudinally to make the electrotype roll 137 operative or inoperative and will again be locked in its set position either by the handle 300 and roll 302 through engagement with the bracket 304 or by the roll 302 and the roll 303 engaging the bracket 304.

As shown in Fig. 25 the strip platen 118 may be adjusted by set screws, so that the desired amount of pressure on the paper may be given.

Figs. 34 and 35 show the method of attaching gears 37 to sleeves 42. These gears 37 are readily riveted or otherwise fastened to clamping links 510, but it is difficult to clamp the links to the sleeves 42 so as certainly to prevent slipping. As shown in these figures, the clamping links 510 are sawed at two points at right angles to the axis of the hub and about half way through, and a longitudinal cut is also made with a saw, as indicated at 515. The two ears thus formed are drawn together by set screws 512, thus forming a very tight clamp, though permitting the ready detachment of the parts for repair.

In Fig. 36 is shown a device found in the machine as made for the market applicable to either or both sets of check printing rolls to compel assembling in proper relations. It will be remembered that both sets of rollers bear or may bear advertising matter. It is desirable to change the electros to use different matter at intervals, but machines of this type are frequently operated by persons with little mechanical training and who might, therefore, replace an electroroll in a wrong relation. To obviate any such error, the impression roll gear 134 or 138 has two of its teeth cut away leaving an intervening tooth 1384 intact. The electroroll 133 or 152 is provided with a disk 1325 having a cut away portion 1326 of such shape and size as just to permit passage of the tooth 1384. In the figure the parts are in normal position and clearly the electroroll may move axially, the tooth 1384 passing through the cut away portion of disk 1325, but if attempt is made to replace the electro, the cut away portion must be precisely in line with tooth 1384, otherwise the disk will be locked by the said tooth. Thus a replacement of the electroroll in correct relation with the other parts is compelled.

While the form of mechanism herein shown and described is admirably adapted to fulfil the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, the combination with registering devices and means for operating the same, of printing devices comprising two pairs of rotatable cylinders arranged for printing on the front and the back of a strip of paper, eccentrics on which one of each of the pairs of cylinders is journaled, means for partly rotating the eccentrics and thereby separating the cylinders to make the cylinders inoperative, means for printing records of transactions upon a record strip of paper and a type carrier included in said means and controlled by the eccentrics.

2. In a machine of the class described, the combination with two recording devices and an operating mechanism common thereto, of means for preventing the operation of one of the recording devices, and a special type controlled by the preventing means for recording upon one of the recording devices when both of said devices are in operative condition.

3. In a machine of the class described, the combination with a detail strip printing mechanism including a special type carrier, of check or receipt printing and feeding mechanism, including feeding rollers, an eccentric bearing for one of the rollers, means for adjusting said bearing and thereby disabling the feed roller, and means connecting the eccentric bearing with the special type carrier.

4. In a machine of the class described, the combination with detail strip printing mechanism including a special type carrier, of check or receipt printing and feeding mechanism, including feeding rollers, means for operating said feeding rollers, hand operated devices for withdrawing said rollers from effective feeding position, and a connection adjusted by said hand operated devices to position said special type carrier.

5. In a machine of the class described, the combination with detail strip printing mechanism including a special type carrier, of check or receipt printing and feeding mechanism, including a pair of feeding rollers, an eccentrically journaled disk on which one of said rollers is mounted, manipulative devices for rotating said disk and thereby separating said rollers, and connections operated by said manipulative devices to adjust said special type carrier of the strip printing device.

6. In a machine of the class described, the combination with independent mechanisms for recording upon a check strip and a record strip, of operating mechanism common thereto, means controlling disabling and enabling of the check recording mechanism, and a special type carrier connected to said enabling and disabling controlling means for recording upon the record strip whenever the check recording mechanism is enabled.

7. In a machine of the class described, the combination with a plurality of type wheels, of means for differentially rotating the same, a pinion fixed to each type wheel, an alining pawl for each pinion, eccentrics on which said alining pawls are pivoted, means for rocking the pawls around their pivots into and out of engagement with the pinions, and said eccentrics being rotatable for the purpose of radially adjusting the alining pawls.

8. In a machine of the class described, the combination with a plurality of type wheels, of means for differentially rotating the same, a pinion fixed to each type wheel, an alining pawl for each pinion, eccentrics on which said alining pawls are pivoted, means for rocking the pawls around their pivots into and out of engagement with the pinions, said eccentrics being rotatable for the purpose of radially adjusting the alining pawls, a notched disk rigid with each eccentric, and a spring co-acting with the notched disks to normally prevent rotation of the same.

9. In a machine of the class described, the combination with differentially adjustable elements, of alining arms for the same, disks having eccentric journals and on which said alining arms are separately carried, and means for manually rotating said eccentric journals and thereby securing adjustment of said alining arms.

10. In a machine of the class described, the combination with differentially adjustable elements, of alining arms for the same, means for forcing the alining arms into contact with said adjustable elements, a shaft and disks eccentrically mounted thereon and on which said alining arms are separately carried, and manually actuated devices for separately rotating said disks.

11. In a machine of the class described, the combination with differential mechanism, of a plurality of totalizers mounted upon a rotatable reel, means for rotating the reel thereby bringing any desired totalizer into operative relation with the differential mechanism, an arm pivoted to said means and movable therewith, means for rocking said arm around its pivot a constant distance, a roll carried by said arm, indicating mechanism, said roll co-acting with the indicating mechanism to set the same in accordance with the position to which the pivoted arm has been moved by the means for rotating the reel.

12. In a machine of the class described, the combination with differential mechanism, of a plurality of totalizers mounted upon a rotatable reel, means for rotating the reel thereby bringing any desired totalizer into operative relation with the differential mechanism, an arm pivoted to said means and movable therewith, means for rocking said arm around its pivot a constant distance, a roll carried by said arm, an indicator and indicator operating mechanism, said roll co-acting with the indicating operating mechanism to set the same in accordance with the position to which the pivoted arm has been moved by the means for rotating the reel, said indicating operating mechanism including a segment gear provided with a heart shaped opening into which the roll on said arm extends and with which it co-acts for the purpose of setting the indicating mechanism.

13. In a machine of the class described, the combination with a differentially movable manipulative arm, of a bar pivoted thereto and bearing a roller, a cam for giving said roller excursions of invariable extent, a segment rack having a heart shaped opening positioned to be engaged by said roller, and indicating devices connected to said segment rack.

14. In a machine of the class described the combination with a differentially movable manipulative arm, of a bar pivoted thereto and bearing a roller, a cam having a circular portion on which said roller rides and constructed, when rotated, to give said roller excursions of invariable extent, a segment having a symmetrical opening with either side of which said roller may engage, and indicating mechanism connected to said segment rack.

15. In a machine of the class described, the combination with a differentially movable manipulative device, and an arm pivoted thereto and having a projection, of an element supporting said projection, means for actuating said element and thereby giving said projection excursions of invariable extent, a pivoted driving device having a symmetrical opening with either side of which said projection may engage, and indicating mechanism constructed to be actuated by said driving device.

16. In a machine of the class described, the combination with a device bearing a plurality of indicia, and a pivoted driving device for the same, permanently connected thereto and having a symmetrical opening, of a manually operable setting device, an element carried by said setting device and having a projection positioned to engage either side of said symmetrical opening, and means for giving said projection excursions of invariable extent and in a direction substantially radial to said pivoted driving device.

17. In a machine of the class described, the combination with an indicator drum, of a pinion secured to the drum, a gear meshing with said pinion, a heart shaped opening in said gear, a member projecting into said opening, a pivot upon which said member is mounted, means for differentially moving said pivot, and means for then rocking said member around its pivot a certain invariable extent.

18. In a machine of the class described, the combination with a segmental controlling device, and a hand operated setting device fast thereto, of a spring plate positioned to be engaged by a part of said controlling device at one end of the stroke thereof, a lever positioned to be engaged by said controlling device part at the other end of its stroke, and spring means resisting movement of said lever.

19. In a machine of the class described, the combination with independent mechanisms for recording upon a check strip and a record strip, of means for feeding the check strip, manipulative devices controlling the check strip feeding means and recording mechanism, and a special type carrier connected to the feeding means for recording upon the record strip the condition of the feeding means and the recording mechanism for the check strip.

20. In a machine of the class described, the combination with independent mechanisms for recording upon a check strip and a record strip, of rollers for feeding the check strip, an eccentric bearing for one of the rollers, a manipulative device for rotating the eccentric bearing and thereby disabling the feed rollers, and a special type carrier connected to the eccentric bearing for recording upon the record strip whenever the feed rollers are in operative condition.

21. In a machine of the class described, the combination with a plurality of type carriers each bearing duplicate sets of type of a platen for taking impressions upon a record strip from one set of type, a second platen for taking impressions upon a check strip from the second set of type, an operating mechanism common to both platens, a special type for recording upon the record strip when the check strip platen is in operative condition, and a manipulative device for disabling the check strip platen and for moving the special type out of recording position.

22. In a machine of the class described, the combination with a plurality of type carriers each bearing duplicate sets of type, of a platen for taking impressions upon a record strip from one set of type, a second platen for taking impressions upon a check strip from the second set of type, feed rollers for the check strip, an operating mechanism common to both platens and the feed rollers, a special type for recording upon the record strip when the check strip platen is in operative condition, and a manipulative device having connections for disabling the check strip platen and the feed rollers and for moving the special type out of recording position.

23. In a machine of the class described, the combination with differentially adjustable elements, of alining arms for same, disks having eccentric journals and on which said alining arms are separately carried, means for manually rotating said disks and thereby securing adjustment of said alining arms, a pivoted frame for moving the pawls in alining position, means for moving the frame and thereby the pawls for alining the adjustable elements, and springs interposed between the pawls and the frame.

24. In a machine of the class described, the combination with a differentially adjustable device, of a member carried thereby, means for giving said member, after the adjustable device has been positioned, excursions of invariable extent, and an element having a heart shaped opening positioned to be engaged by said invariably movable member so as to move said element directly from one position to another.

25. In a machine of the class described, the combination with a plurality of type carriers each bearing duplicate sets of type, of ink pads and means for positioning the same to ink both sets of type, a platen and means operating the same first to depress one of the pads into contact with the type of one set and then to take an impression from the inked type, means connecting the pads so that when one is depressed to ink one set of type the other pad will ink the second set of type, and a second platen for taking an impression from the second set of type.

26. In a machine of the class described, the combination with type carriers, of paper feeding mechanism including a feed roller, an eccentric disk carrying said roller, a shaft supporting said disk, means for turning said shaft to withdraw said feed roller, a platen, and a platen operating cam mounted to rotate with said feed roller, but prevented from being withdrawn therewith.

27. In a machine of the class described, the combination with a plurality of cash drawers, of latching devices for retaining the cash drawers in closed positions, a main operating mechanism, a manipulative device, operating mechanism for the latching devices operated upon each operation of the main operating mechanism and controlled by said manipulative device, and a second manipulative device adapted to operate said latching devices singly and independent of said main operating mechanism.

28. In a machine of the class described, the combination with a cash drawer, a main operating mechanism, of a latching device for the drawer, operating mechanism for the latching device adapted to be operated upon each operation of the main operating mechanism, a recording device, a manipulative device controlling said operating mechanism and the recording device, and a second manipulative device operating said latching device independent of said main operating mechanism.

29. In a machine of the class described, the combination with a cash drawer, a main operating mechanism, of a latching device for the drawer, operating mechanism for the latching device adapted to be operated upon each operation of the main operating mechanism, a recording device, a manipulative device controlling said operating mechanism and the recording device, a second manipulative device for operating said latching device independent of said main operating mechanism, and a key operated lock normally preventing actuation of said second manipulative device.

30. In a machine of the class described, the combination with a plurality of cash drawers, a main operating mechanism, of drawer latching mechanism, a drawer latch selecting device and means for operating the selecting device operated upon each operation of the main operating mechanism, a manipulative device for differentially setting said selecting device, operating mechanism for said selecting device, and a second manipulative device for operating said selecting device singly and independent of said main operating mechanism.

31. In a machine of the class described, the combination with a main operating mechanism of a plurality of drawers with means for holding them closed, means requiring an operation of the operating mechanism for releasing any drawer desired and a second means operable independent of said means for releasing any drawer desired independent of an operation of the operating mechanism.

32. In a machine of the class described, the combination with a main operating mechanism, of a plurality of drawers, means for predetermining which drawer shall be opened, means dependent upon the further operation of the operating mechanism for opening the selected drawer, and a second opening means independent of the said first opening means for opening the selected drawer independent of a further operation of the operating mechanism.

33. In a machine of the class described, the combination with an operating mechanism, of a plurality of drawers, a drawer releasing mechanism common to all of the drawers, means for adjusting said drawer releasing mechanism to predetermine the drawer which shall be opened upon an operation of the operating mechanism, and means for operating said drawer releasing mechanism independent of an operation of the operating mechanism to open any desired drawer.

34. In a machine of the class described, the combination with a plurality of drawers, of a main operating mechanism, a drawer releasing mechanism common to all of the drawers and operable by the main operating mechanism, means for predetermining which drawer shall be opened, and means for operating the drawer releasing mechanism to open the selected drawer independent of an operation of the main operating mechanism.

35. In a machine of the class described, the combination with a plurality of cash drawers and means for normally holding them closed, a main operating mechanism, means for selecting the drawer to be opened upon an operation of the main operating mechanism, and a second means for operating said releasing means independent of said operating mechanism.

36. In a machine of the class described, the combination with a plurality of type wheels, of means for differentially rotating the same, a pinion fixed to each type wheel, an alining pawl for each pinion, eccentrics on which said alining pawls are pivoted, means for rocking the pawls around their pivots into and out of engagement with the pinions, means for manually rotating the eccentric pivots to radially adjust the alining pawls, and means normally preventing rotation of said eccentric pivots.

37. In a machine of the class described, the combination with an accounting mechanism, of a rotary indicator, a driving device for the indicator, said driving device having a symmetrical opening, a movable member projecting into said opening, means for differentially placing said movable member in the opening, and means requiring an operation of the accounting mechanism for moving said movable member to actuate the indicator driving device, thereby positioning the indicator to indicate the position at which the aforesaid movable member was placed.

38. In a machine of the class described, the combination with totalizing mechanisms, of a rotary indicator, a driving device for the indicator, said driving device having a symmetrical opening, a movable member projecting into said opening, means for differentially placing said movable member in the opening, and means requiring an operation of the totalizing mechanism for moving said movable member to actuate the indicator driving device, thereby positioning the indicator to indicate the position at which the aforesaid movable member was placed.

39. In a machine of the class described, the combination with a totalizing mechanism, of a plurality of normally inaccessible receptacles, means requiring an operation of the totalizing mechanism for rendering any desired receptacle accessible, and a second means operable independent of the totalizing mechanism for rendering the desired receptacle accessible.

40. In a machine of the class described, the combination with recording retaining devices, of mechanism for entering items therein, a plurality of normally inaccessible receptacles, means requiring an operation of the item entering mechanism for rendering any desired receptacle accessible, and a second means operable independent of said item entering mechanism for rendering the desired receptacle accessible.

41. In a machine of the class described, the combination with accounting devices and operating mechanism therefor, of a plurality of normally inaccessible receptacles, means requiring an operation of the accounting device operating mechanism for rendering any desired receptacle accessible, and a second means operable independent of said accounting device operating mechanism for rendering the desired receptacle accessible.

42. In a machine of the class described, the combination with registering devices, of operating mechanism for the registering devices, a plurality of normally inaccessible receptacles, means requiring an operation of the registering device operating mechanism for rendering any desired receptacle accessible, and a second means operable independent of said operating mechanism for rendering the desired receptacle accessible.

43. In a machine of the class described, the combination with a recording mechanism, of a plurality of normally inaccessible receptacles, means requiring an operation of the recording mechanism for rendering any desired receptacle accessible, and a second means not requiring an operation of the recording mechanism for rendering the desired receptacle accessible.

In testimony whereof I affix my signature in the presence of two witnesses.

EDWARD J. VON PEIN.

Witnesses:
F. E. HAMILTON,
A. RUMMLER.